United States Patent
Siman-Tov et al.

(10) Patent No.: US 10,562,318 B2
(45) Date of Patent: Feb. 18, 2020

(54) METHOD AND SYSTEM FOR COMPENSATING FOR A MALFUNCTIONING NOZZLE

(71) Applicant: LANDA CORPORATION LTD., Rehovot (IL)

(72) Inventors: Alon Siman-Tov, Or Yehuda (IL); Shahar Klinger, Rehovot (IL); Mattetyahu Litvak, Tel Aviv (IL); David Tal, Rehovot (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 16/181,265

(22) Filed: Nov. 5, 2018

(65) Prior Publication Data

US 2019/0134990 A1    May 9, 2019

Related U.S. Application Data

(60) Provisional application No. 62/581,051, filed on Nov. 3, 2017.

(51) Int. Cl.
| | |
|---|---|
| *B41J 2/21* | (2006.01) |
| *H04N 1/405* | (2006.01) |
| *H04N 1/401* | (2006.01) |
| *H04N 1/409* | (2006.01) |

(52) U.S. Cl.
CPC ........... *B41J 2/2139* (2013.01); *B41J 2/2146* (2013.01); *H04N 1/405* (2013.01); *H04N 1/409* (2013.01); *H04N 1/4015* (2013.01)

(58) Field of Classification Search
CPC .............. B41J 2/2139; B41J 2/2146
See application file for complete search history.

(56) References Cited

U.S. PATENT DOCUMENTS

| | | |
|---|---|---|
| 6,575,549 B1 | 6/2003 | Silverbrook et al. |
| 8,411,326 B2 | 4/2013 | Inoue et al. |
| 8,496,313 B2 | 7/2013 | Ueshima et al. |
| 8,646,862 B2 | 2/2014 | Wu et al. |
| 8,646,869 B2 | 2/2014 | Yamazaki et al. |
| 8,740,339 B2 | 6/2014 | Yamazaki et al. |
| 9,218,645 B2 | 12/2015 | Shibata et al. |
| 2004/0189556 A1 | 9/2004 | Tsujino et al. |
| 2004/0223014 A1 | 11/2004 | Barr et al. |
| 2005/0083361 A1 | 4/2005 | Nakanishi et al. |
| 2015/0258807 A1* | 9/2015 | Sudo ............... B41J 2/2139 347/9 |
| 2015/0360491 A1 | 12/2015 | Billow et al. |

FOREIGN PATENT DOCUMENTS

WO    WO-2015029789 A1    3/2015

OTHER PUBLICATIONS

Co-pending U.S. Appl. No. 16/237,608, filed Dec. 31, 2018.
WO2015029789 Machine Translation (by EPO and Google)—published Mar. 5, 2015, Fujifilm Corp.

* cited by examiner

*Primary Examiner* — Julian D Huffman
(74) *Attorney, Agent, or Firm* — Marc Van Dyke

(57) ABSTRACT

Embodiments of the invention relate to techniques whereby sufficient compensation is provided to counteract the deleterious effects of a malfunctioning nozzle (i.e. which might create a white streak within the printed ink image) in a manner that is faithful to/harmonious with the underlying AM or FM screening. In this manner, it is possible to minimize the negative impact a failed or malfunctioning nozzle has upon the printed ink image.

6 Claims, 28 Drawing Sheets

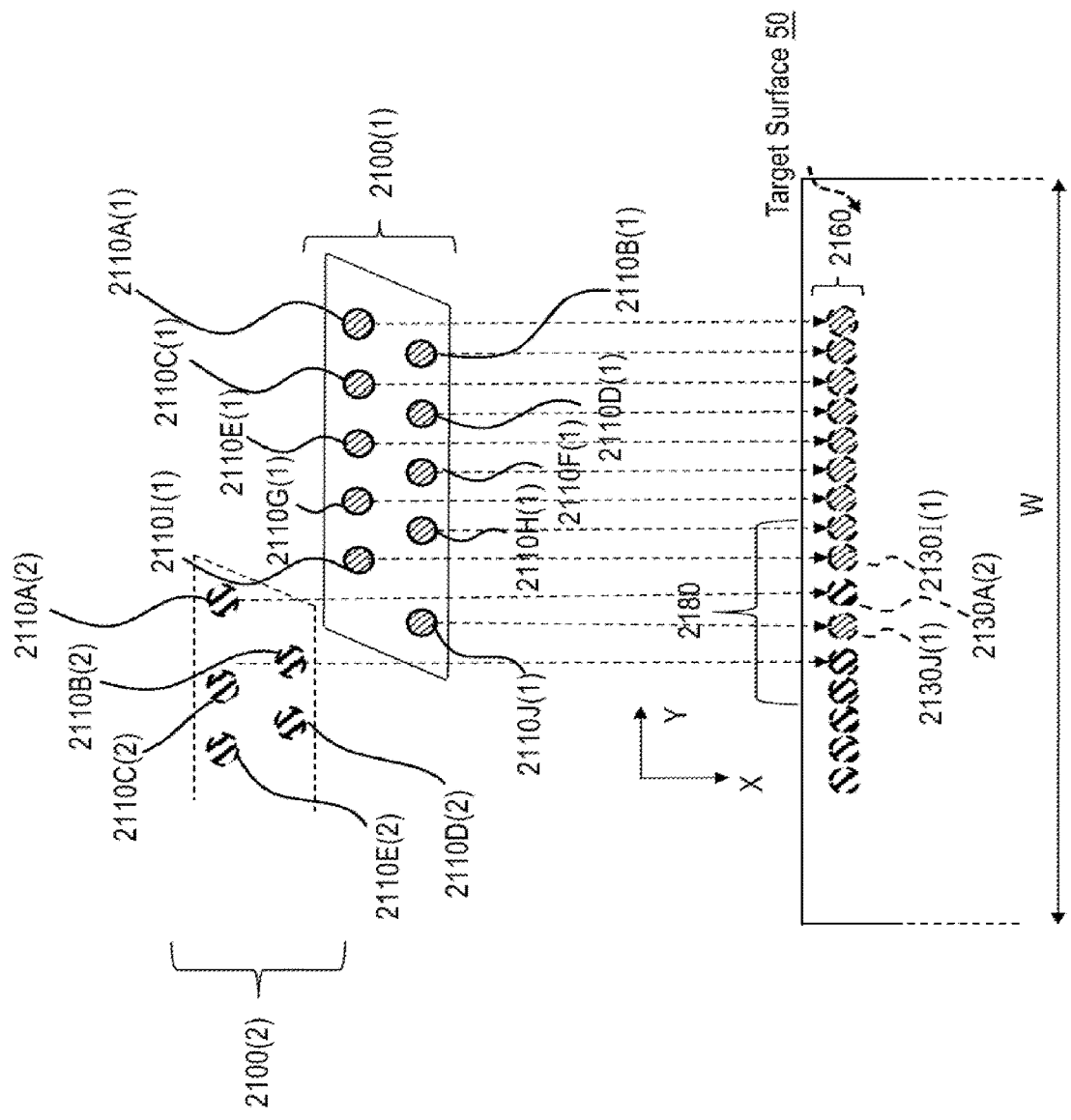

Fig. 5A

Example A: Single-bit

Fig. 10A

METHOD AND SYSTEM FOR COMPENSATING FOR A MALFUNCTIONING NOZZLE

CROSS-REFERENCE TO RELATED APPLICATIONS

The present application claims priority to U.S. Provisional Application No. 62/581,051 filed on Nov. 3, 2017, which is incorporated by reference herein in its entirety.

FIELD OF THE INVENTION

The present invention relates to systems and methods for printing ink images—for example, in a manner that compensates for a malfunctioning or inoperative nozzle.

BACKGROUND OF THE INVENTION

The following issued patents and patent publications provide potentially relevant background material, and are all incorporated by reference in their entirety: U.S. Pat. Nos. 7,165,824, 7,085,002, 7,607,752, 7,585,038, and 7,533,953.

SUMMARY OF EMBODIMENTS

Aspects of disclosed embodiments relate to digital printing, in particular to a system and method capable to provide compensation for a malfunctioning image dot source, such as an ink nozzle or a light-emitting diode employed in an electrostatic digital printing process.

In particular, embodiments of the invention relate to techniques whereby sufficient compensation is provided to counteract the deleterious effects of a malfunctioning nozzle (i.e. which might create a white streak within the printed ink image) in a manner that is faithful to/harmonious with the underlying AM or FM screening. In this manner, it is possible to minimize the negative impact a failed or malfunctioning nozzle has upon the printed ink image.

A method of compensating for or reducing the effect of a malfunctioning or inoperative nozzle $Noz_i$ corresponding to the $i^{th}$ column of a half-toned digital image IMG is disclosed. According to the method, the half-toned digital image IMG specifies, for each position (i,j) of the digital image whether or not a droplet is to be deposited at a corresponding location on a target surface, the $i^{th}$ column having first (i.e. $(i-1)^{th}$ column) and second (i.e. $(i+1)^{th}$ column) neighboring columns disposed on opposite sides of the $i^{th}$ column. The method comprising: a. establishing a frequency for droplet-size increase; b. specifying first and second candidate-sets of positions within the half-toned digital image IMG, the first candidate-set of positions being periodically disposed within the first neighboring column at the established frequency, the second candidate-set of positions being periodically disposed within the second neighboring column at the established frequency; c. determining the data-occupied positions within the $i^{th}$ column of the half-toned digital image IMG, the $i^{th}$ column of the half-toned digital image IMG corresponding to the malfunctioning or inoperative nozzle; d. for each data-occupied position within the $i^{th}$ column of the half-toned digital image IMG, respectively determining if at least one column-neighboring position within the neighboring columns is data-vacant; and e. printing, on the target surface, a modified version of the digital image IMG so as to enforce of first, second and third data-moving rules and so as to enforce a droplet-size-increase rule, wherein the rules are defined as follows: i. according to the first data-moving rule, whenever a given position (i,j) within the $i^{th}$ column of the half-toned digital image IMG is data-occupied, at most one data-moving droplet is deposited on the target surface; ii. according to the second data-moving rule, this data-moving droplet is only deposited if one or both of the column-neighboring positions (i.e. one or both of the positions (i−1,j) and (i+1,j)) is data-vacant; iii. according to the third data-moving rule, if deposited, the data-moving droplet is only deposited at a location corresponding to one of the column-neighboring positions that is data-vacant in the source half-toned image; and iv. according to the droplet size-increase rule, a deposited droplet is subjected to nozzle-compensation droplet-size increase if and only if the deposited droplet corresponds to a position belonging to one of the first and second candidate-sets of positions.

A method of compensating for or reducing the effect of a malfunctioning or inoperative nozzle $Noz_i$ corresponding to the $i^{th}$ column of a half-toned digital image IMG is disclosed. According to the method, the half-toned digital image IMG specifies, for each position (i,j) of the digital image whether or not a droplet is to be deposited at a corresponding location on a target surface, the $i^{th}$ column having first (i.e. $(i-1)^{th}$ column) and second (i.e. $(i+1)^{th}$ column) neighboring columns disposed on opposite sides of the $i^{th}$ column. The method comprising: a. determining the data-occupied positions within the $i^{th}$ column of the half-toned digital image IMG, the $i^{th}$ column of the half-toned digital image IMG corresponding to the malfunctioning or inoperative nozzle; b. for each data-occupied position within the $i^{th}$ column of the half-toned digital image IMG, respectively determining if at least one column-neighboring position within the neighboring columns is data-vacant; and e. printing, on the target surface, a modified version of the digital image IMG so as to enforce of first, second and third data-moving rules wherein the rules are defined as follows: i. according to the first data-moving rule, whenever a given position (i,j) within the $i^{th}$ column of the half-toned digital image IMG is data-occupied, at most one data-moving droplet is deposited on the target surface; ii. according to the second data-moving rule, this data-moving droplet is only deposited if one or both of the column-neighboring positions (i.e. one or both of the positions (i−1,j) and (i+1,j)) is data-vacant; iii. according to the third data-moving rule, if deposited, the data-moving droplet is only deposited at a location corresponding to one of the column-neighboring positions that is data-vacant in the source half-toned image;

A method of compensating for or reducing the effect of a malfunctioning or inoperative nozzle $Noz_i$ corresponding to the $i^{th}$ column of a half-toned digital image IMG is disclosed. According to the method, the half-toned digital image IMG specifies, for each position (i,j) of the digital image whether or not a droplet is to be deposited at a corresponding location on a target surface, the $i^{th}$ column having first (i.e. $(i-1)^{th}$ column) and second (i.e. $(i+1)^{th}$ column) neighboring columns disposed on opposite sides of the $i^{th}$ column. The method comprising: a. establishing a frequency for droplet-size increase; b. specifying first and second candidate-sets of positions within the half-toned digital image IMG, the first candidate-set of positions being periodically disposed within the first neighboring column at the established frequency, the second candidate-set of positions being periodically disposed within the second neighboring column at the established frequency; and c. printing, on the target surface, a modified version of the digital image IMG so as to enforce a droplet-size-increase rule such that a deposited droplet is subjected to nozzle-compensation droplet-size increase if and only if the deposited droplet corresponds to a position belonging to one of the first and second candidate-sets of positions.

In some embodiments, the half-toned image IMG is an FM half-toned image.

In some embodiments, a value of the established frequency is greater than 1.

In some embodiments, the frequency is fractional.

In some embodiments, the frequency is integral.

In some embodiments, the frequency is established dynamically according to content of the half-toned digital image.

In some embodiments, the frequency is established so that for a target portion of an image that is darker (lighter), a smaller (larger) frequency is selected.

A method of compensating for or reducing the effect of a malfunctioning or inoperative nozzle $Noz_i$ corresponding to the $i^{th}$ column of an AM half-toned digital image IMG is disclosed. According to the method, the half-toned digital image IMG specifies, for each position (i,j) of the digital image whether or not a droplet is to be deposited at a corresponding location on a target surface, the $i^{th}$ column having first (i.e. $(i-1)^{th}$ column) and second (i.e. $(i+1)^{th}$ column) neighboring columns disposed on opposite sides of the $i^{th}$ column. The method comprising: a. establishing a frequency for droplet-size increase; b. specifying first and second candidate-sets of positions within the AM half-toned digital image IMG, the first candidate-set of positions being periodically disposed within the first neighboring column at the established frequency, the second candidate-set of positions being periodically disposed within the second neighboring column at the established frequency; and c. printing, on the target surface, a modified version of the digital image IMG so as to enforce of a data-moving rule and so as to enforce a droplet-size-increase rule, wherein the rules are defined as follows: i. according to the data-moving rule, no data-moving droplet is ever deposited on the target surface; ii. according to the droplet size-increase rule, a deposited droplet is subjected to nozzle-compensation droplet-size increase if and only if the deposited droplet corresponds to a position belonging to one of the first and second candidate-sets of positions.

In some embodiments, a value of the established frequency is greater than 1.

A printing system for printing a half-toned digital image IMG is disclosed. The image IMG that specifies, for each position (i,j) of the digital image whether or not a droplet is to be deposited at a corresponding location on a target surface, the printing system comprising: a. a plurality of nozzles for depositing droplets of ink onto the target surface so as to print, each nozzle $Noz_i$ of the plurality corresponding to the $i^{th}$ column of the half-toned digital image IMG, the $i^{th}$ column of the image IMG having first (i.e. $(i-1)^{th}$ column) and second (i.e. $(i+1)^{th}$ column) neighboring columns disposed on opposite sides of the $i^{th}$ column, b. electronic circuitry for controlling deposition of the droplets by the nozzle array according to content of the half-toned digital image IMG to print the half-toned digital image IMG, or a derivative thereof, on the target surface, the control circuitry configured, when the nozzle $Noz_i$ is malfunctioning or inoperative, to perform nozzle compensation as follows: i. establishing a frequency for droplet-size increase; ii. specifying first and second candidate-sets of positions within the half-toned digital image IMG, the first candidate-set of positions being periodically disposed within the first neighboring column at the established frequency, the second candidate-set of positions being periodically disposed within the second neighboring column at the established frequency; iii. determining the data-occupied positions within the column of the half-toned digital image IMG, the column of the half-toned digital image IMG corresponding to the malfunctioning or inoperative nozzle; iv. for each data-occupied position within the $i^{th}$ column of the half-toned digital image IMG, respectively determining if at least one column-neighboring position within the neighboring columns is data-vacant; and v. printing, on the target surface, a modified version of the digital image IMG so as to enforce of first, second and third data-moving rules and so as to enforce a droplet-size-increase rule, wherein the rules are defined as follows: A. according to the first data-moving rule, whenever a given position (i,j) within the $i^{th}$ column of the half-toned digital image IMG is data-occupied, at most one data-moving droplet is deposited on the target surface; B. according to the second data-moving rule, this data-moving droplet is only deposited if one or both of the column-neighboring positions (i.e. one or both of the positions (i-1,j) and (i+1,j)) is data-vacant; C. according to the third data-moving rule, if deposited, the data-moving droplet is only deposited at a location corresponding to one of the column-neighboring positions that is data-vacant in the source half-toned image; and D. according to the droplet size-increase rule, a deposited droplet is subjected to nozzle-compensation droplet-size increase if and only if the deposited droplet corresponds to a position belonging to one of the first and second candidate-sets of positions.

A printing system for printing a half-toned digital image IMG is disclosed. The image IMG that specifies, for each position (i,j) of the digital image whether or not a droplet is to be deposited at a corresponding location on a target surface, the printing system comprising a. a plurality of nozzles for depositing droplets of ink onto the target surface so as to print, each nozzle $Noz_i$ of the plurality corresponding to the $i^{th}$ column of the half-toned digital image IMG, the $i^{th}$ column of the image IMG having first (i.e. $(i-1)^{th}$ column) and second (i.e. $(i+1)^{th}$ column) neighboring columns disposed on opposite sides of the column, b. electronic circuitry for controlling deposition of the droplets by the nozzle array according to content of the half-toned digital image IMG to print the half-toned digital image IMG, or a derivative thereof, on the target surface, the control circuitry configured, when the nozzle $Noz_i$ is malfunctioning or inoperative, to perform nozzle compensation as follows: i. determining the data-occupied positions within the $i^{th}$ column of the half-toned digital image IMG, the $i^{th}$ column of the half-toned digital image IMG corresponding to the malfunctioning or inoperative nozzle; ii. for each data-occupied position within the $i^{th}$ column of the half-toned digital image IMG, respectively determining if at least one column-neighboring position within the neighboring columns is data-vacant; and iii. printing, on the target surface, a modified version of the digital image IMG so as to enforce of first, second and third data-moving rules wherein the rules are defined as follows: A. according to the first data-moving rule, whenever a given position (i,j) within the $i^{th}$ column of the half-toned digital image IMG is data-occupied, at most one data-moving droplet is deposited on the target surface; B. according to the second data-moving rule, this data-moving droplet is only deposited if one or both of the column-neighboring positions (i.e. one or both of the positions (i-1,j) and (i+1,j)) is data-vacant; and C. according to the third data-moving rule, if deposited, the data-moving droplet is only deposited at a location corresponding to one of the column-neighboring positions that is data-vacant in the source half-toned image.

A printing system for printing a half-toned digital image IMG is disclosed. The image IMG that specifies, for each position (i,j) of the digital image whether or not a droplet is to be deposited at a corresponding location on a target surface, the printing system comprising a. a plurality of nozzles for depositing droplets of ink onto the target surface so as to print, each nozzle $Noz_i$ of the plurality corresponding to the $i^{th}$ column of the half-toned digital image IMG, the $i^{th}$ column of the image IMG having first (i.e. $(i-1)^{th}$ column) and second (i.e. $(i+1)^{th}$ column) neighboring columns disposed on opposite sides of the $i^{th}$ column, b. electronic circuitry for controlling deposition of the droplets by the nozzle array according to content of the half-toned digital image IMG to print the half-toned digital image IMG, or a derivative thereof, on the target surface, the control circuitry configured, when the nozzle $Noz_i$ is malfunctioning or inoperative, to perform nozzle compensation as follows: i. establishing a frequency for droplet-size increase; ii. specifying first and second candidate-sets of positions within the half-toned digital image IMG, the first candidate-set of positions being periodically disposed within the first neighboring column at the established frequency, the second candidate-set of positions being periodically disposed within the second neighboring column at the established frequency; and iii. printing, on the target surface, a modified version of the digital image IMG so as to enforce a droplet-size-increase rule such that a deposited droplet is subjected to nozzle-compensation droplet-size increase if and only if the deposited droplet corresponds to a position belonging to one of the first and second candidate-sets of positions.

In some embodiments, the half-toned image IMG is an FM half-toned image.

In some embodiments, a value of the established frequency is greater than 1.

In some embodiments, the frequency is fractional.

In some embodiments, the frequency is integral.

In some embodiments, the frequency is established dynamically according to content of the half-toned digital image.

In some embodiments, the frequency is established so that for a target portion of an image that is darker (lighter), a smaller (larger) frequency is selected.

A printing system for printing an AM half-toned digital image IMG that specifies, for each position (i,j) of the digital image whether or not a droplet is to be deposited at a corresponding location on a target surface, the printing system comprising: a. a plurality of nozzles for depositing droplets of ink onto the target surface so as to print, each nozzle $Noz_i$ of the plurality corresponding to the $i^{th}$ column of the AM half-toned digital image IMG, the $i^{th}$ column of the image IMG having first (i.e. $(i-1)^{th}$ column) and second (i.e. $(i+1)^{th}$ column) neighboring columns disposed on opposite sides of the $i^{th}$ column, b. electronic circuitry for controlling deposition of the droplets by the nozzle array according to content of the half-toned digital image IMG to print the half-toned digital image IMG, or a derivative thereof, on the target surface, the control circuitry configured, when the nozzle $Noz_i$ is malfunctioning or inoperative, to perform nozzle compensation as follows: i. establishing a frequency for droplet-size increase; ii. specifying first and second candidate-sets of positions within the AM half-toned digital image IMG, the first candidate-set of positions being periodically disposed within the first neighboring column at the established frequency, the second candidate-set of positions being periodically disposed within the second neighboring column at the established frequency; and iii. printing, on the target surface, a modified version of the digital image IMG so as to enforce of a data-moving rule and so as to enforce a droplet-size-increase rule, wherein the rules are defined as follows: A. according to the data-moving rule, no data-moving droplet is ever deposited on the target surface; and B. according to the droplet size-increase rule, a deposited droplet is subjected to nozzle-compensation droplet-size increase if and only if the deposited droplet corresponds to a position belonging to one of the first and second candidate-sets of positions.

In some embodiments, a value of the established frequency is greater than 1.

BRIEF DESCRIPTION OF THE DRAWINGS

FIG. 3 is a schematic enlarged view of ink ejection nozzles and their corresponding printing projections onto a target surface, according to an exemplary embodiment.

FIGS. 5A, 6A-6B are tables respectively illustrating first, second and third examples of half-toned source data.

FIG. 10A illustrates the example of FIG. 9B after the data-shifting operations have been performed.

Figure 1A:
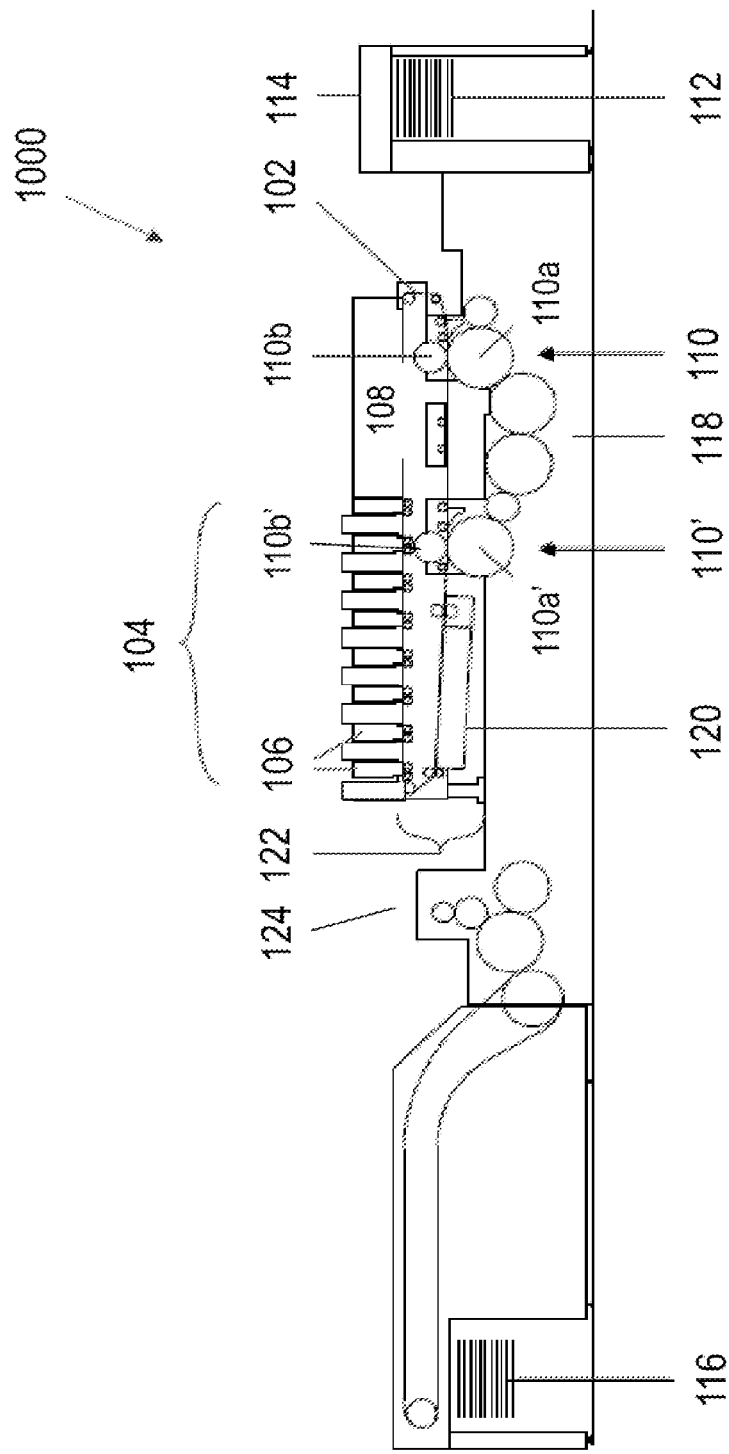
FIG. 1A is a schematic illustration of a printing system, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical components but may not be referenced in the description of all figures.

DETAILED DESCRIPTION OF ILLUSTRATED EMBODIMENTS

Figure 8:
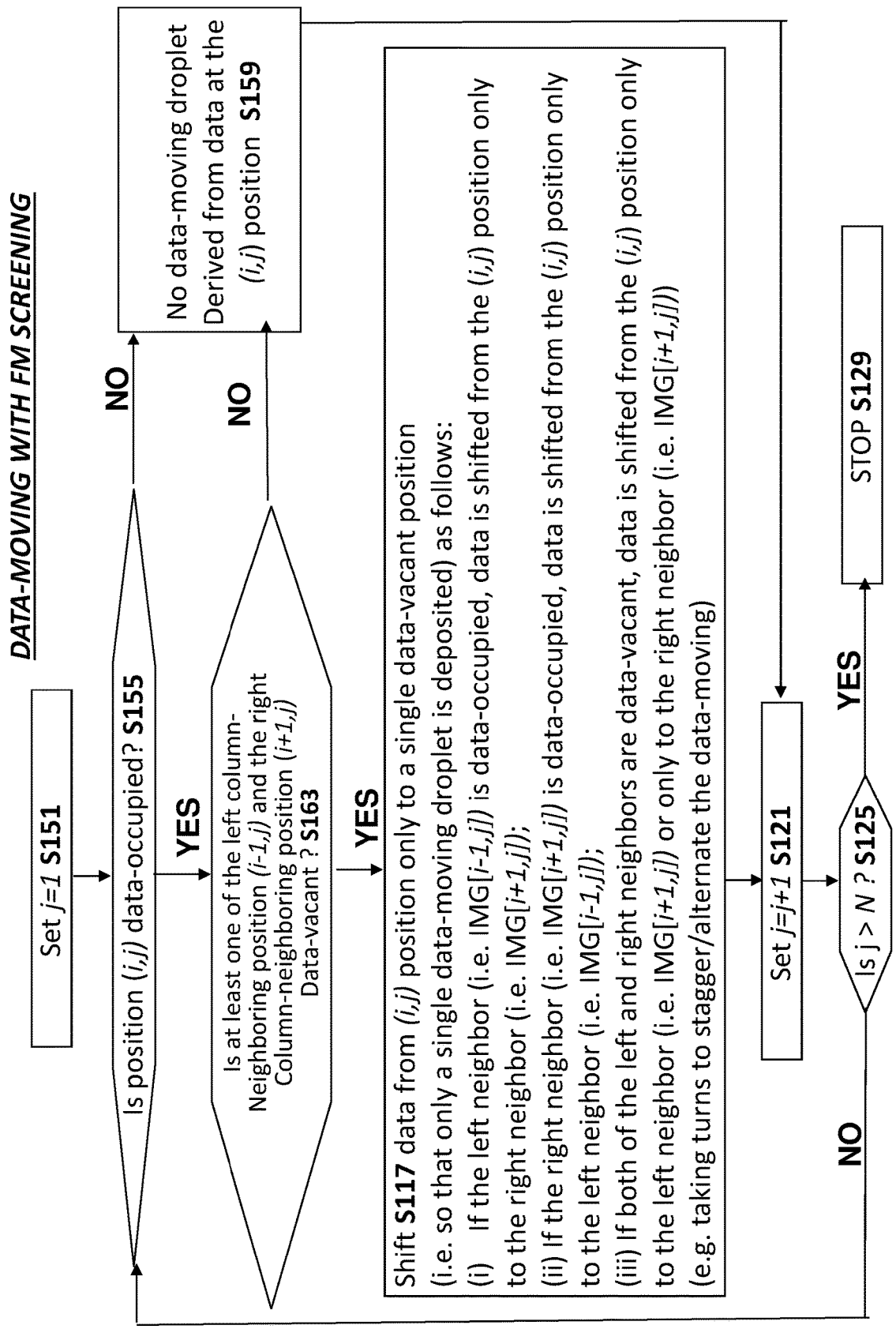
FIG. 8 is a flow chart of a method for determining a position corresponding to a location where a data-moving droplet is to be deposited.
Figure 12A:
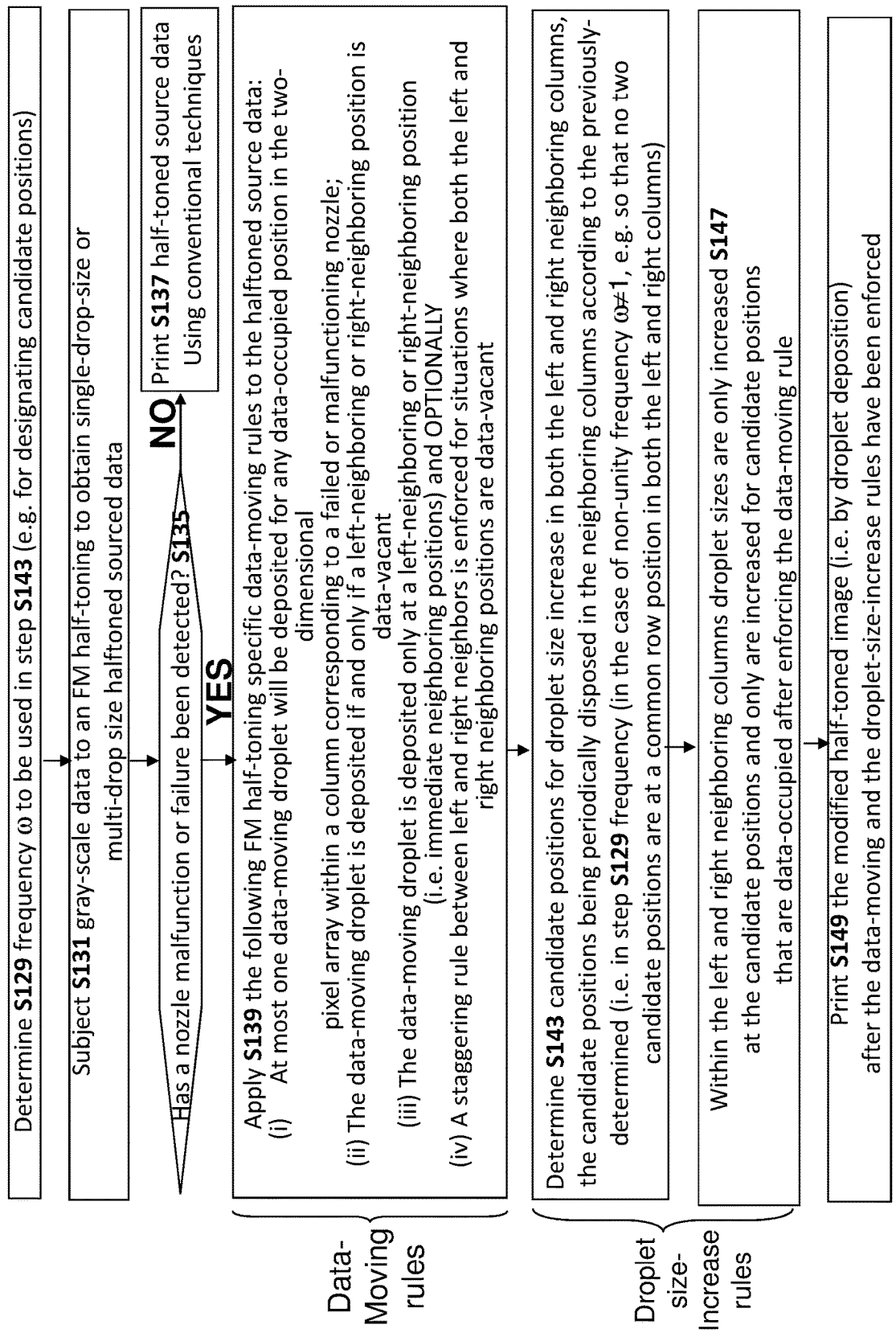
FIG. 12A is a flow chart of a method of nozzle-compensation (e.g. when FM halftoning is used) where both data-moving rules and droplet size-increase rules are enforced
Figure 17:
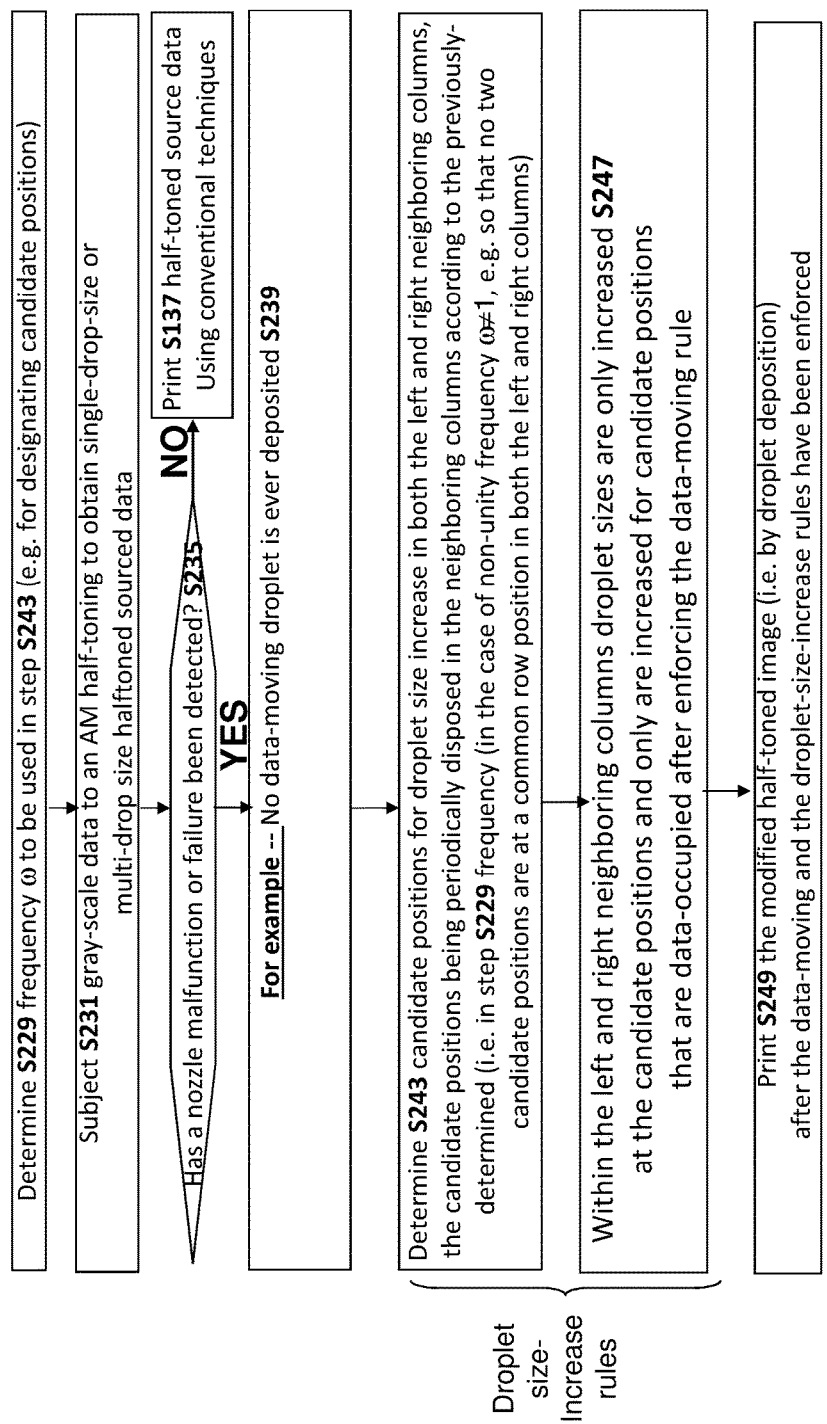
FIG. 17 is a flow chart of a method of nozzle-compensation (e.g. when AM halftoning is used) where both data-moving rules and droplet size-increase rules are enforced.

FIGS. 8, 12A, and 17 are flow charts of exemplary methods of compensating for malfunctioning nozzle. In embodiments of the invention, FIGS. 8 and 12A are especially applicable to FM-halftoned images, while FIG. 17 is especially applicable to AM-halftoned images.

Embodiments of the invention may entail enforcement of data-moving rules and/or droplet size-increase rules. In embodiments of the invention, the methods of FIGS. 8 and 12A include data-moving rules—for example, some data-moving rules are explained with reference to FIGS. 9A-9C. In embodiments of the invention, the methods of FIGS. 12A and 17 include droplet size-increase rules—for example, some droplet size-increase rules are explained with reference to FIGS. 11A-11B.

Brief Overview of FIGS. 1A-6B—FIGS. 1A-6B relate both to (i) situations where all dot sources (e.g. nozzles) are properly functioning and there is no need for 'nozzle compensation' (see FIGS. 7-17 and the accompanying discussion related to 'nozzle compensation'), or (ii) to situations where one or more nozzles malfunction or fail and one or more nozzle compensation techniques are employed (e.g. in response to detection or prediction of nozzle failure or malfunction).

Brief Overview of FIGS. 7-17—FIGS. 7-17 are all specific for situations where one or more nozzles malfunction or fail and one or more nozzle compensation techniques are employed (e.g. in response to detection or prediction of nozzle failure or malfunction).

A Discussion of FIGS. 1-6B

FIG. 1A is a schematic illustration of a printing system, according to some embodiments.

Figure 1B:
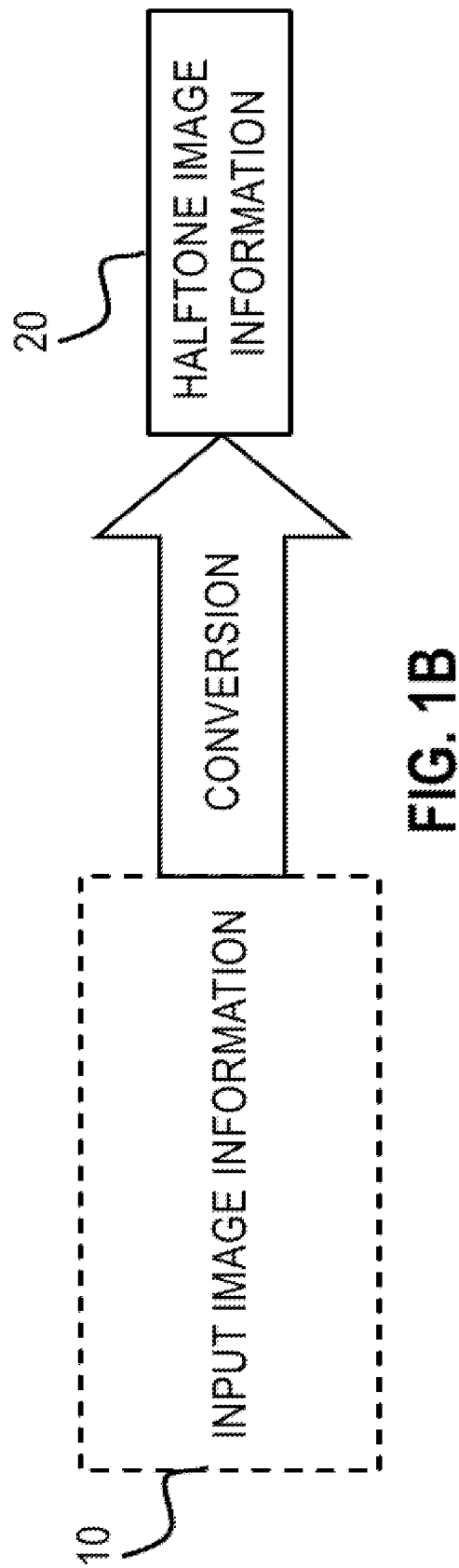
FIG. 1B is a system flow chart schematically illustrating the operating principle of a digital printing system.

FIG. 1B is a system flow chart schematically illustrating the operating principle of a digital printing system.

Figure 2A:
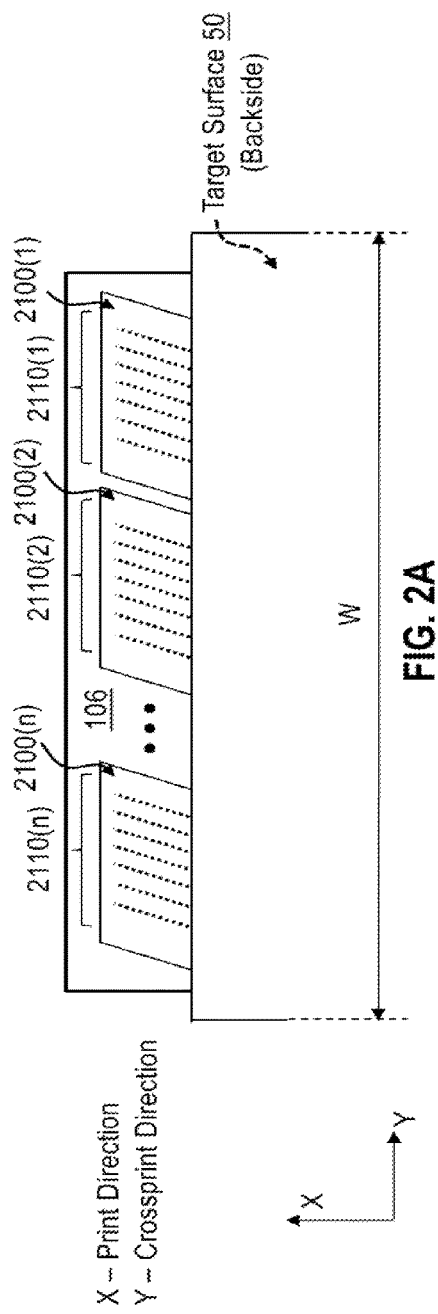
FIG. 2A is a schematic bottom view illustration of a plurality of printheads on a printbar and of a backside of a target surface, each printhead comprising an array of ink ejection nozzles, according to an exemplary embodiment.

FIG. 2A is a schematic bottom view illustration of a plurality of printheads on a printbar and of a backside of a target surface, each printhead comprising an array of ink ejection nozzles, according to an exemplary embodiment.

Figure 2B:
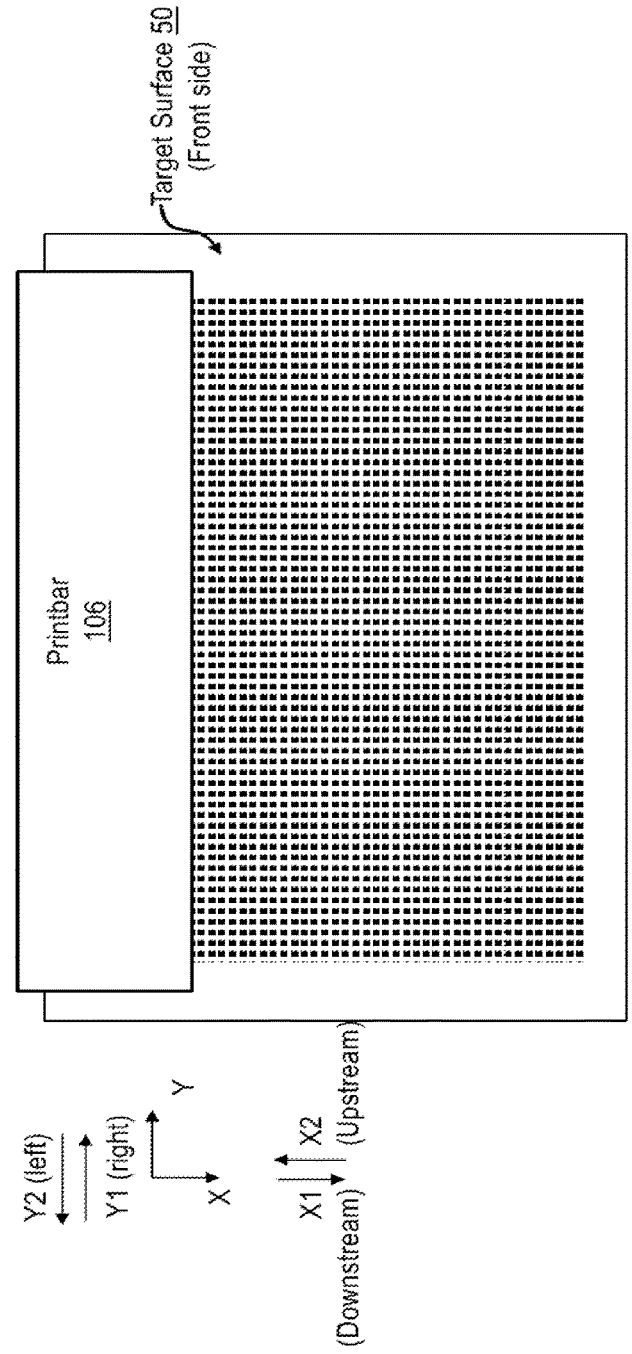
FIG. 2B is a schematic illustration of the front side of the target surface of FIG. 2A, and of a pixel array arranged in an orthogonal grid to be applied onto the target surface, according to an exemplary embodiment.

FIG. 2B is a schematic illustration of the front side of the target surface of FIG. 2A, and of a pixel array arranged in an orthogonal grid to be applied onto the target surface, according to an exemplary embodiment.

FIG. 3 is a schematic enlarged view of ink ejection nozzles and their corresponding printing projections onto a target surface, according to an exemplary embodiment.

Figure 4:
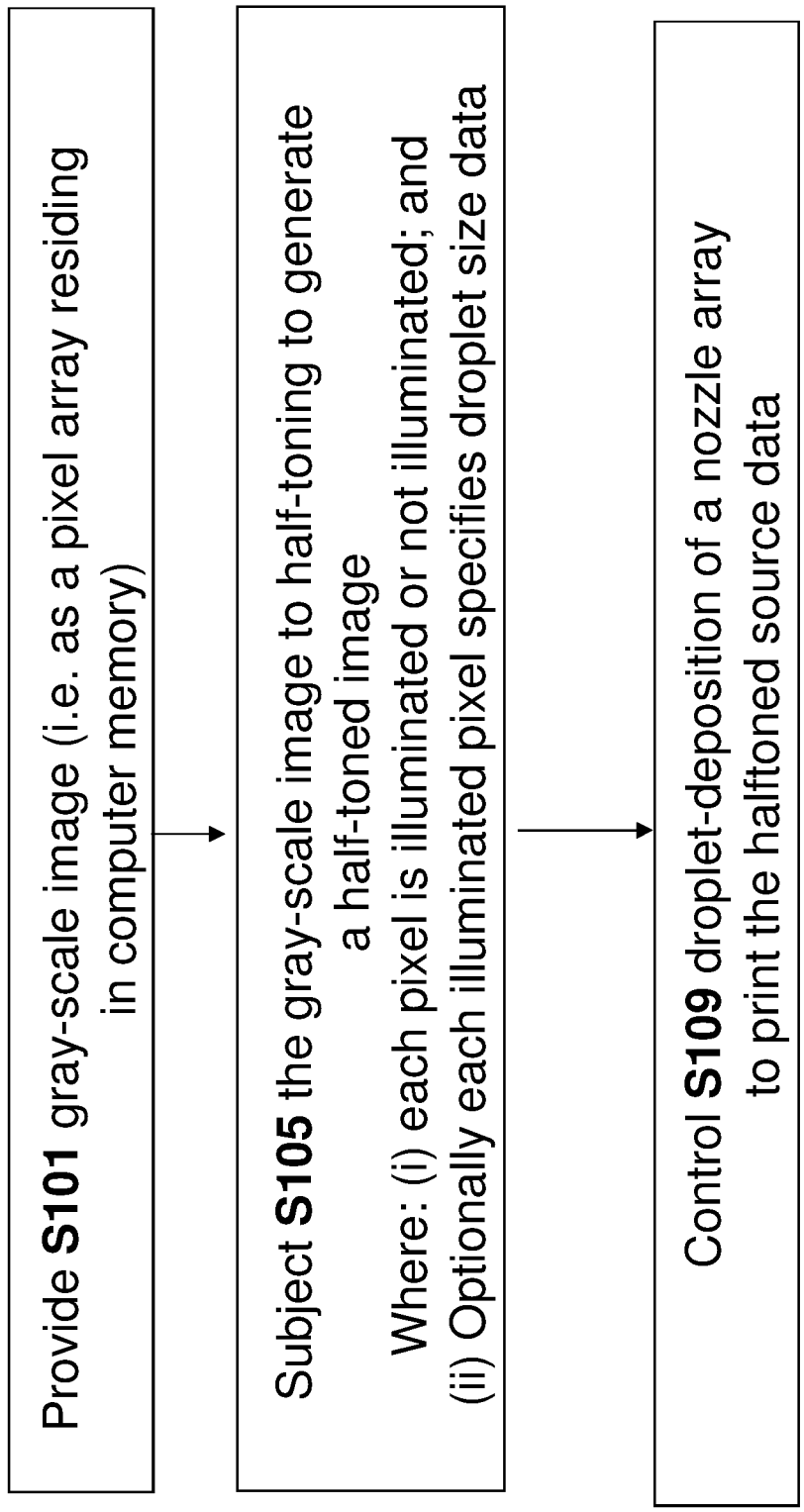
FIG. 4 is a flow chart of a method for printing, either when all nozzles are operating normally and there is no need for nozzle compensation techniques, or when one or more nozzles malfunctions (or fails).

FIG. 4 is a flow chart of a method for printing, either when all nozzles are operating normally and there is no need for nozzle compensation techniques, or when one or more nozzles malfunctions (or fails).

Figure 5A:
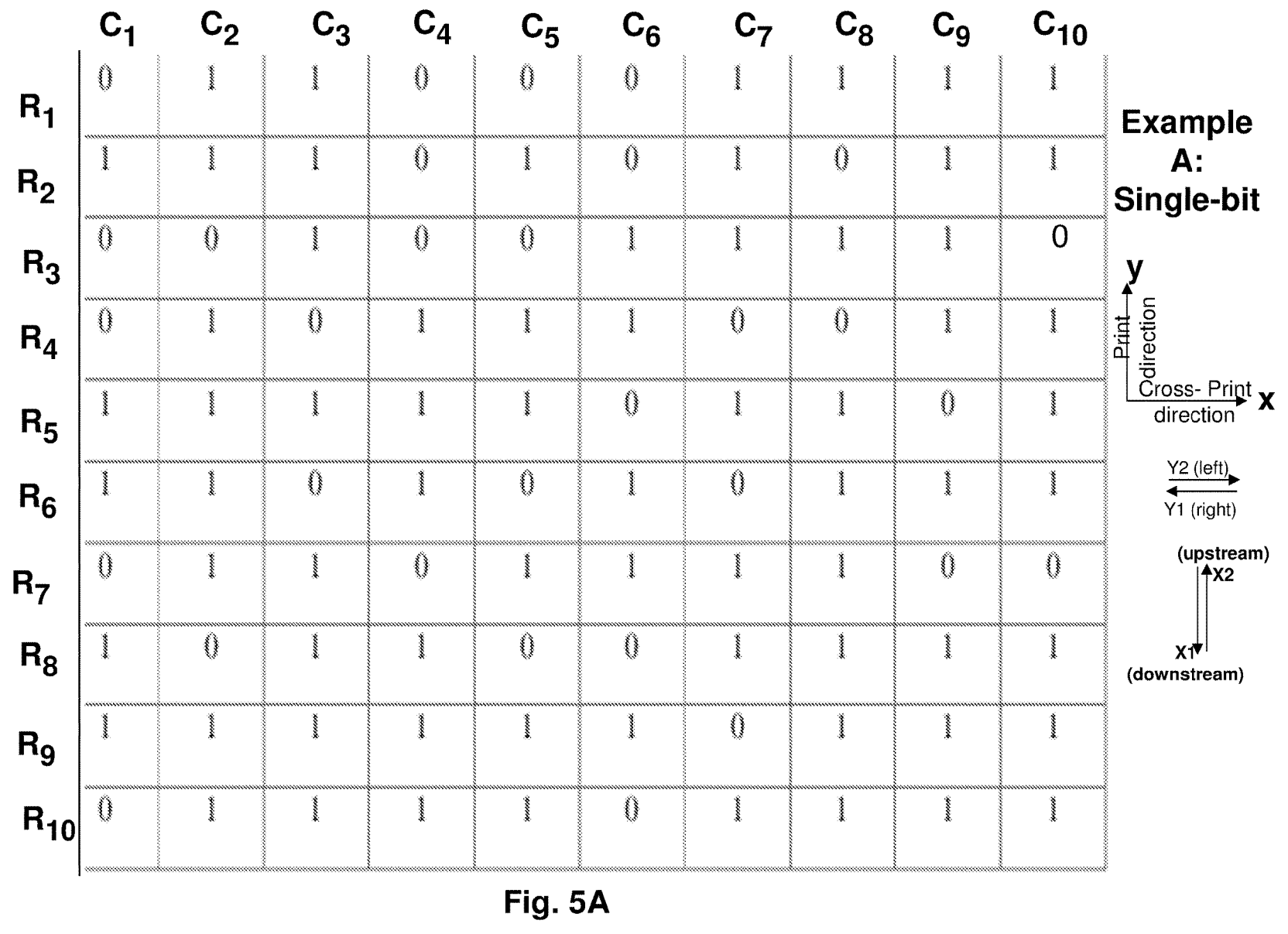

FIG. 5A is a table illustrating a first example of half-toned source data.

Figure 5B:
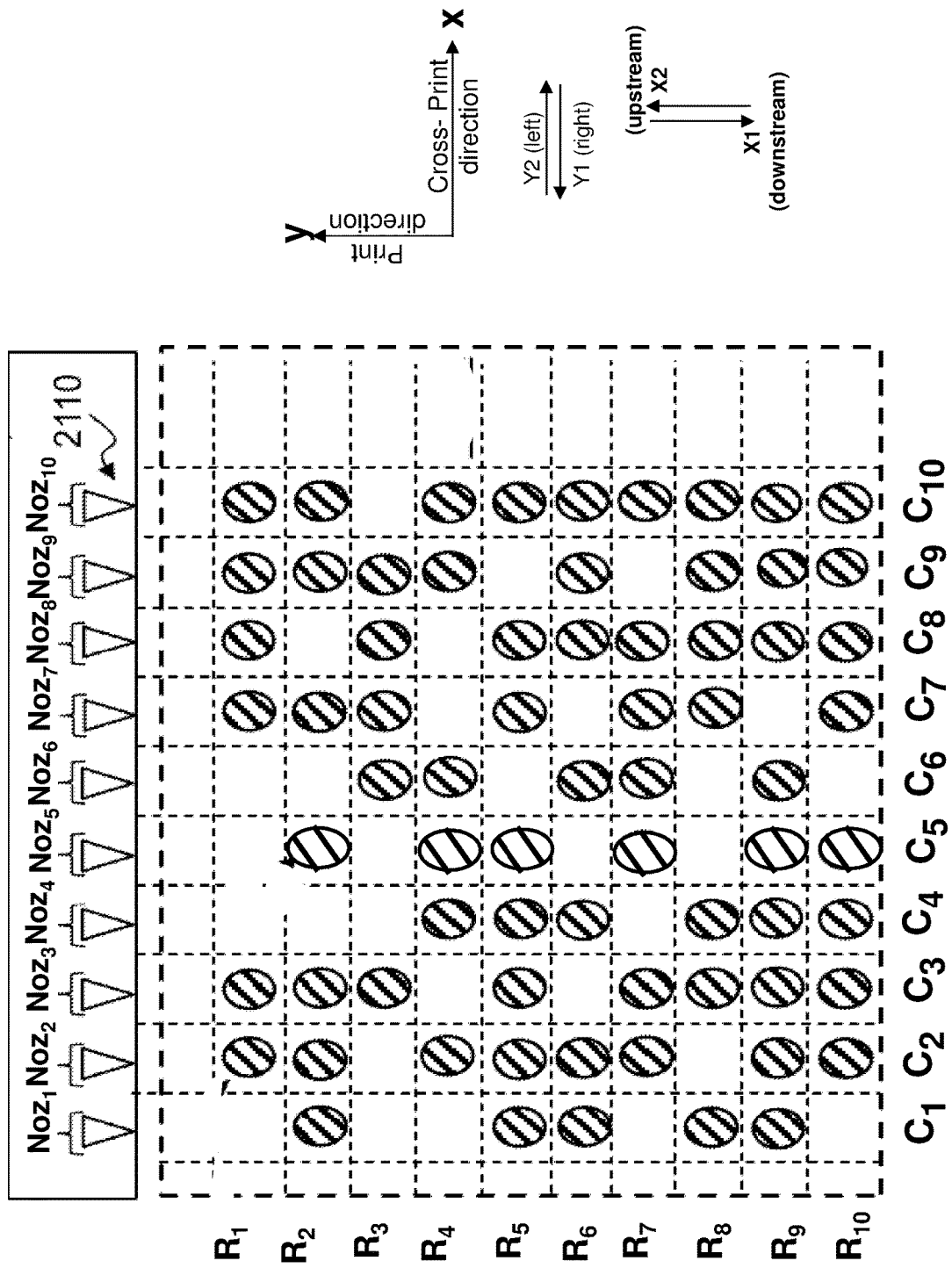
FIG. 5B is a drawing illustrating deposition of droplets onto a target surface by nozzles.

FIG. 5B is a drawing illustrating deposition of droplets onto a target surface by nozzles at locations, and optionally droplet sizes, specified by the half-toned source data.

Figure 6A:
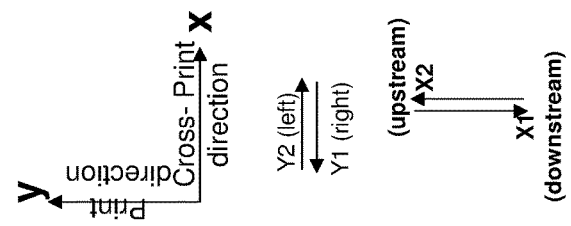

FIG. 6A is a table illustrating a second example of half-toned source data.

Figure 6B:
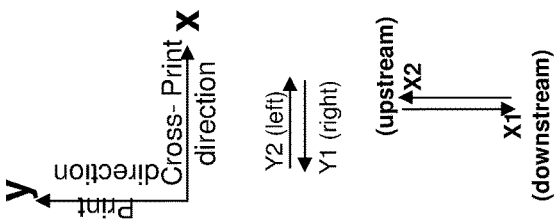

FIG. 6B is a table illustrating a third example of half-toned source data.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical components but may not be referenced in the description of all figures.

Aspects of disclosed embodiments relate to a digital printing system and method. In the "Discussion of FIGS. 7-17" (below), it will be discussed how the digital printing system and method are able to compensate for or reduce the effect of one or more image dot sources identified as being malfunctioning. Such image dot sources may, for example, be ink ejection nozzles for printing an ink image, or light emitting diodes (LEDs) that can be employed to create a differentially static charged image in electrostatic digital printing. Independently of the exact nature of the image dot sources applicable for each printing system, such elements are typically arranged in arrays, such arrays (e.g., nozzle plate of a print head or LED chips) being generally in relative motion with a target surface or substrate (e.g., ITM, printing substrate, photoreceptive member etc.) so as to allow the application of dots in a desired pattern across the width and length of the target surface.

Discussion of FIG. 1A—Reference is made to FIG. 1A. A printing system 1000 having an intermediate transfer member (ITM) 102 in the form of a blanket guided over various rollers of a blanket conveyor system 122 to travel in an endless loop as a belt, is schematically shown. While circulating through the loop, the blanket passes through various stations. The invention is equally applicable to printing systems wherein the intermediate transfer member is a drum, the specific designs of the various stations being accordingly adapted.

At an image forming station 104, print bars 106 deposit droplets of inks onto the image forming surface of the ITM 102 to form an ink image. The inks of the different bars 106, each comprising a plurality of printheads better shown in FIGS. 2A and 3A, are usually of different colours and all the inks have particles of resin and colouring agent in a liquid carrier, apart from some transparent inks or varnishes which may not contain a pigment.

Though the image forming station illustrated in FIG. 1A comprises eight print bars, an image forming station may comprise fewer or more print bars. For instance, an image forming system may have three print bars each jetting Cyan (C), Magenta (M) or Yellow (Y) inks, or four print bars with the addition of a Black ink (K).

The ITM 102 then passes through a drying station 108 where the ink droplets are dried and rendered tacky before they reach impression stations 110 where the ink droplets are transferred onto sheets 112 of substrate.

Two impression stations 110 are provided to enable printing on both sides of the substrate, one impression station being positioned upstream and the other downstream of the perfecting system. Each impression station 110, 110' includes an impression cylinder 110a, 110a' and a pressure roller 110b, 110b' which have between them a nip within which the blanket 102 is pressed against a substrate. In the illustrated embodiment, the substrate is formed as sheets 112 that are transferred from an input stack 114 to an output stack 116 by a substrate transport system 118. The substrate transport system 118, may comprise a perfecting system to allow double-sided, or duplex, printing.

In yet other embodiments, a single impression station 110 is provided, or more than two impression embodiments are provided. The illustrated system relates to a perfecting system capable of duplex printing—other embodiments relate to a simplex system which prints only on a single side of substrate.

It should be mentioned that the invention is equally applicable to printing systems designed to print on a substrate in the form of a continuous web instead of individual sheets. In such cases, the substrate transfer system is accordingly adapted to convey the substrate from an input roller to a delivery roller.

After passing through the impression stations 110, 110a', the ITM 102 may passthrough other stations, such as a cleaning station 120, before returning to the image forming station 104. Printing systems may comprise additional stations adapted to their respective printing process and may further comprise, for instance, a treatment station for treating the ITM, a cooling or a heating station to modify the temperature of the intermediate transfer member along its path, a finishing station 124 for further processing the printed substrate (e.g., coating, trimming, punching, embossing, creasing, etc.), and so on. All such stations may rely on conventional equipment, or at least similar principles, and their integration in printing systems will be clear to the person skilled in the art without the need for more detailed description in the present context.

A problem in such a printing system, with which the present disclosure is concerned, is the deleterious impact malfunctioning image dot sources (e.g., clogged or deviating ink nozzles) may have on print quality.

A printing system according to embodiments disclosed herein is operative to determine the position for providing a compensating dot while retaining, as much as possible, the pattern of dots that would have been applied onto the target surface if no dot source was malfunctioning.

Determining the position for providing a compensating dot may be performed heuristically based on empirical data (e.g., an input tone value and/or a percentage of coverage percentage), as outlined herein below in more detail.

In different embodiments, the target surface may be a printing substrate (e.g., paper, cardboard, plastic, fabric, etc.), an intermediate transfer member (ITM), an image receiving member receiving a liquid ink-based image from the ITM, or a selectively chargeable print drum of a LED-based printing system.

Discussion of FIG. 1B—Reference is made to FIG. 1B. One salient feature of all digital printing systems is the conversion of data descriptive of continuous "input" image information into data descriptive of dots or static charges to be provided onto a target surface. As schematically shown in FIG. 1B, data descriptive of continuous input image information 10 may for example be stored in volatile and/or non-volatile computer memory and/or in other suitable storage (as outlined herein in greater detail) which is processed to print halftone image 20. More specifically, digital printing systems may be operative to convert data descriptive of input image information 10 into an output command signal for obtaining an ink ejection pattern or electric charges that yields a corresponding image on the target surface, using halftoning techniques (e.g., FM or AM screening). Halftoning techniques may include known and/or future halftoning methods.

When the digital input image resides in computer memory (or other computer-readable storage), each position in the array of pixels may be assigned with a tone value describing the brightness of the color to be printed. However, despite a tone value being associated with each pixel positions, not every pixel position does necessarily comprise a dot to be provided.

Discussion of FIGS. 2A-2B and 3—Further reference is now made to FIGS. 2A and 2B. The terms "print direction" or "printing direction" as used herein may refer to the direction of relative motion of halftoning dot sources and the target surface during printing. As shown in greater detail in FIG. 2B, downstream direction is represented by arrow X1 (also: "positive X-direction"), and upstream direction is represented by arrow X2 (also: "negative X-direction")— the 'downstream' and 'upstream' directions are along the 'print' direction.

Positional terms such as "left", and "right" as used herein do not necessarily indicate that, for example, a "left" component is left to a "right" component, as such directions, components or both may be flipped, rotated, moved in space, placed in a diagonal orientation or position, placed horizontally or vertically, or similarly modified. A left and right direction and/or position may relate to a particular illustration and may herein simply be referred to as "one side" and "other side" or "first side" and "second side" of the point of reference under discussion.

The terms "left" and "right" used with respect to the position of pixel columns relative to the non-printed pixel column are defined by a viewing orientation onto a front side of a target surface 50 and in relation to the downstream or positive printing direction X1. Correspondingly, positive Y direction (Y1) is referred to as pointing to the right, and negative Y (Y2) direction is referred to as pointing to the left. The Y direction can also be referred to as the cross-printing direction.

Selecting with respect to a given row a subsequent row in printing direction is indicated by an increase of an index of N(i) to N(i+1). Further, selecting with a respect to a given column another column which is adjacent (either to the left or to the right) of the given column, is referenced by a respective decrease or increase in the sequential alphabetic designation. For instance, columns adjacent to the left and right of given column ME have column designations Mn and MF, respectively.

It is noted that during printing, the image dot sources may be stationary relative to world coordinates while the target surface may move relative to the image dot sources or vice versa. In some embodiments, both the image dot sources and the target surface may be in movement relative to each other. The arrows X1 and X2 shown in FIG. 2B refer to the relative movements during any of the aforementioned options.

For the sake of the discussion that follows, a column of pixels or pixel positions in an orthogonal grid as shown schematically in FIG. 2B and employed for forming a halftone image on target surface 50 is considered to extend in parallel to the print direction, while a row of pixels is considered to extend perpendicularly to such print direction, i.e., in the cross-print or Y-direction. In other words, pixels positions in a column would be arranged substantially in X-direction, whereas the pixel positions in a row extend substantially in Y-direction.

According to some embodiments, the method may additionally include making a selection of pixel positions for providing (e.g., adding or enlarging) a dot to effect compensation for a malfunctioning dot source that was rendered inoperable. The pixels selected in such step (herein the "primary candidate pixel positions" or "primary candidate pixels") may be at positions which are laterally adjacent to the left and/or the right of the non-printed pixel column, at positions where pixel data was already present and/or where pixel data was subsequently added during the compensation procedure, as outlined herein below in more detail.

Additional reference is made to FIG. 3. Printer apparatus 1600 schematically shown in FIG. 2A may comprise one or more printheads, e.g., printhead 2100(1) and 2100(2). Each printhead 2100(n) may include one or more dot sources, e.g., ink ejection nozzles 2110 (e.g., 2110A(n), 2110B(n), 2110C (n), 2110B(n), and so on; n referring to a printhead number) arranged on printheads 2100 in the present illustration. Shown in FIG. 2A are elements 2110(n), 2100(n), 2110(2), 2100(2), 2110(1) and 2100(1). Merely to simplify the discussion that follows, only one printbar (see 106 in FIG. 1A) is schematically illustrated for the formation of a monochrome image based on, e.g., black ink. However, this should by no means to be construed as limiting. Accordingly, additional printbars may be employed, e.g., to enable the formation of a full-color image.

Printbar 106 may be moveable relative to a target surface 50 along at least one of two print directions, for example in the cross-print direction Y. A plurality of ink ejection nozzles 2110, schematically illustrated in FIG. 2A as dots, and as circles in FIG. 3A, may be arranged along a direction Y which may fully or at least partially extend over most of the width W of target surface 50. During printing, target surface 50 may be passed underneath the outlets of ink ejection nozzles 2110. The volume of an ink droplet ejected by any one of ink ejection nozzles 2110 may range, for example, from 2 picoliters to 11 picoliters. Clearly, alternative droplet volume ranges may be applicable.

As exemplified in FIG. 3 with respect to 10 ink ejection nozzles 2110A to 2110J, ink ejection nozzles 2110 may be arranged such that a projection of ink ejection nozzles 2110 in one of the print directions X1 or X2 will show its corresponding ink dots 2130 side-by-side each other, to form a single dot lineup 2160 on a target surface 50 extending in cross-print direction Y-direction, which is perpendicular to print direction X. Shown in FIG. 3 are some or all of the following elements: 2100(2), 2110A(1), 2110A(2), 2110B (1), 2110B(2), 2110C(1), 2110C(2), 2110D(1), 2110D(2), 2110E(1), 2110E(2), 2110F(1), 2110F(2), 2110G(1), 2110G (2), 2110H(1), 2110H(2), 21101(1), 21101(2), 2110J(1), 2110J(2), 2100(2), 2130J( ) 2130A(2), and 21301(1).

A printhead 2100 may comprise along a print direction X at least two columns of ink ejection nozzles 2110. The at least two columns of ink ejection nozzles 2110 may be arranged offset in Y-direction relative to each other such as to attain a staggered arrangement for which a projection in print direction X result in a non-overlapping and, optionally, interlaced arrangement projection of dots 2130 that can be seen as a single dot lineup 2160. Such arrangement of ink ejection nozzles 2110 allows attaining an increased density of dots per inch (DPI), compared to the DPI that may be obtainable if printhead 2100 was employing ink ejection nozzles 2110 arranged in Y-direction in one column only. It is noted, however, that in some embodiments, a single column or, alternatively, more than two columns of ink ejection nozzles 2110 may be acceptable to obtain a single dot lineup 2160 of projected dots 2130.

Printhead 2100 may employ a multitude (e.g., employ hundreds or thousands) of ink ejection nozzles 2110 which are arranged so as to allow for the timed deposition or ejection of ink dots side-by-side in Y-direction according to a single nozzle line 2160 formed perpendicular to the relative print direction of target surface 50. For example, printhead 2100 may employ or comprise ink ejection nozzles that are arranged in 64 rows. Each row of nozzles may comprise 32 ink ejection nozzles. Thus, printhead 2100 may in some embodiments refer to a printhead 2100 that comprises, e.g., 64×32=2048 ink ejection nozzles 2110.

As shown schematically in FIG. 3, the distances between neighboring dots 2130 or, in other words, the spatial frequency of dots 2130 forming dot lineup 2160 may vary along the Y-direction. For example, closer to the edges of printheads 2100, the spatial frequency may decrease, as is shown in such section of dot lineup 2160 designated by alphanumeric label "2180".

It is noted that merely for the discussion that follows, and therefore without being construed as limiting, printheads 2100(1) and 2100(2) shown in FIG. 3 are illustrated as employing 10 ink ejection nozzles 2110 (2110A to 2110J) each, and arranged in two columns of 5 nozzles at some distance along X between each other. More specifically, a first and second column is shown to comprise a first and second set of five ink ejection nozzles, respectively, in an offset arrangement along direction Y to attain the staggered, non-overlapping formation and, optionally, interlaced arrangement, with respect to a projection along a print direction X to obtain single dot lineup 2160.

According to some embodiments, a first printhead, e.g., printhead 2100(1) may be arranged relative to a second printhead, e.g., printhead 2100(2), so that one or more ink ejection nozzles of the second printhead may be interlaced between two ink ejection nozzles of the first printhead and vice versa. For example, in dot lineup 2160, a dot 2130A(2) which may be assigned to ink ejection nozzle 2110A(2) of the second printhead 2100(2), may be sandwiched between dots 21301(1) and 2130J(1), which are respectively applied by ink ejection nozzles 21101(1) and 2110J(1) of first printhead 2100(1). Such a nozzle configuration principle may herein be referred to as the "interlaced arrangement".

Discussion of FIGS. 4 (Flowchart of Printing)—FIG. 4 is a flowchart of a method for printing images. In step S101, a gray-scale image (e.g. per color—for at least one color) is provided as a pixel array (e.g. in computer memory). For example, the gray scale image may have at least 25 levels or least 50 levels or at least 100 levels of luminance. In step S105, the gray-scale image is subjected to half-toning (e.g. AM half-toning or FM half-toning) to generate a half-toned image where: (i)(i) each pixel is illuminated or not illuminated; and (ii) Optionally each illuminated pixel specifies droplet size data. In step S109, droplet-deposition of a nozzle array is controlled to print the half-toned image (i.e. which was generated in step S105).

Discussion of FIGS. 5A-5B (Examples of Data)—FIG. 5A illustrates one example of a half-toned digital image (e.g. stored in computer memory in step S101)—in this case, each position in the two-dimensional data array has only a single bit (i.e. 'on/illuminated' or 'off/not illuminated'). In the example of FIG. 5A, the half-toned image is represented as a 10×10 matrix, IMG[i,j] (i is the 'column' value and j is the 'row' value) where IMG[1,1]=0; IMG [2,1]=1; IMG[3,1]=1; IMG[4,1]=0; IMG [5,1]=0; IMG [6,1]=0; IMG[7,1]=1; IMG [8,1]=1; IMG [9,1]=1; IMG [10,1]=1; IMG[1,2]=1; IMG [2,2]=1; IMG [3,2]=1; IMG[4,2]=0; IMG [5,2]=1; IMG [6,2]=0; IMG[7,2]=1; IMG [8,2]=0; IMG [9,2]=1; IMG [10,2]=1; and so on.

FIG. 5B illustrates an array of 10 nozzles $Noz_1 \ldots Noz_{10}$ which collectively print the digital image IMG[i,j] of FIG. 5A. Each nozzle $Noz_i$ ($1 \leq i \leq 10$) is disposed in a physical location (i.e. in the cross print direction) corresponding to a respective column of the matrix of FIG. 5A. The first nozzle $Noz_1$ deposits droplets only at locations on the target surface corresponding to positions of the 1s in first column $C_1$ of the matrix IMG[i,j] of FIG. 5A, the second nozzle $Noz_1$ deposits droplets only at locations on the target surface corresponding to positions of the 1s in second column $C_2$ of the matrix IMG[i,j] of FIG. 5A, and so on. For example, the array of nozzles $Noz_1 \ldots Noz_{10}$ and the target surface are in motion relative to each other in the print direction, and the droplet deposition timing of each nozzle is electronically controlled to produce the pattern specified by a respective column of IMG[i,j]. In one example, the nozzles are stationary while the target surface is in motion in the print direction; in another examples, the target surface is stationary while the nozzles are in motion in the print direction.

As illustrated in FIG. 5B, droplets (shown as striped ovals) are deposited only at locations on the target surface that correspond to a position within IMG[i,j] where a '1' is present.

Definitions

Within this application the following terms should be understood to have the following meaning:

A) 'position' vs. 'location'—a 'position' is within two-dimensional array digital image IMG. A position is specified by an ordered pair of integers (i,j) signifying the it column and the $j^{th}$ row within the matrix IMG. The value of data in the digital image (e.g. the digital image illustrated a matrix in FIG. 5A) at the position (i,j) is IMG[i] [j]. In contrast to 'positions' which specifies a value within a matrix, a 'location' is a real-world physical location on the target surface. Thus, in FIG. 5B, droplets (illustrated by striped ovals) are deposited on the target surface at locations shown in the figure. Typically, when printing a halftoned digital image, droplets are deposited only at locations on the target surface that correspond to a position within the digital image IMG.

B) 'corresponding location'—it is possible to overlay a grid over the target surface, where within each grid is a 'location' that corresponds to a 'position' within the digital image of FIG. 5A. Thus, each position (specified by a column value and a row value) within the digital image has a 'corresponding location' (i.e. physical location which can be characterized by a column value and a row value within a grid) on the target surface.

C) 'column' vs. 'row'—a 'column' (i.e. within digital image as shown in FIG. 5A or on a target surface as shown in FIG. 5B) is always aligned with the print-direction (i.e. for a fixed-position (for digital image) or fixed-location (on the surface) in the cross-print direction. A 'row' is always aligned with the cross-print-direction (i.e. for a fixed-position (for digital image) or fixed-location (on the surface) in the print direction).

D) 'gray-scale image' vs. 'half-toned image'—as discussed above with reference to FIG. 4, digital images are subjected to AM or FM screening in step S105 of FIG. 4. The result is a half-toned digital image that is binary with respect to 'deposit/do not deposit' (i.e. droplet presence) and optionally specifies droplet size. An FM half-toned image is generated by subjecting a gray-scale image to an FM half-toning, and an AM-half-toned image is generated by subjecting a gray-scale image to an AM half-toning A gray scale image has more than two possible levels of luminance per pixel—e.g. at least 10 levels or at least 25 levels or at least 50 levels or at least 100 levels. The term 'gray' is not limiting to the color 'gray' and merely indicates that more than two levels of luminance are available per pixel (i.e. for any color including but not limited to the commonly used cyan, magenta, yellow and key (black)).

In contrast, a half-toned image includes, for each pixel, only two possible levels of luminance (i.e. 'pixel not illuminated' and 'pixel illuminated') and optionally droplet size information.

E) 'single-bit half-toned image' (specifying only desired droplet locations) vs. 'multi-bit half-toned image' (specifying desired droplet locations and droplet size)—as noted above, a half-toned digital optionally specifies droplet size. The half-toned digital image of FIGS. 5A and 6B specify only desired droplet location and do not specify droplet size—thus, these digital image may store only a single bit of data at each position. In contrast, the half-toned digital image of FIG. 6A specifies droplet size as well. Other example of a half-toned images are illustrated in FIGS. 6A and 6B.

Comparing the matrices of FIGS. 5A and 5B to each other, it is clear that the set of positions (specified by the ordered pair (i,j)) in the matrix IMG of FIG. 5A where the value $IMG_{FIG.\ 5A}[i][j]$ is non-zero is identical to the set of the positions in the matrix of FIG. 6A where the value $IMG_{FIG.\ 6A}[i][j]$ is non-zero. Furthermore, the set of positions (specified by the ordered pair (i,j)) in the matrix IMG of FIG. 5A where the value $IMG_{FIG.\ 5A}[i][j]$ is zero is identical to the set of the positions in the matrix of FIG. 6A where the value $IMG_{FIG.\ 6A}[i][j]$ is zero. However, in contrast to the matrix of FIG. 5A where each position specifies a single bit of data (i.e. only 'deposit/do not deposit' (i.e. droplet presence) data), for the matrix of FIG. 6A droplet size data is specified as well, where a '2' value signifies a larger droplet than a '1' value.

The matrix of FIG. 5A specifies droplet deposition at both the positions (2,1) and (3,1)—i.e. $IMG_{FIG.\ 5A}[2][1] \neq 0$ and $IMG_{FIG.\ 5A}[3][1] \neq 0$. This is true also for the matrix of FIG. 6A—$IMG_{FIG.\ 6A}[2][1] \neq 0$ and $IMG_{FIG.\ 6A}[3][1] \neq 0$. However, the matrix of FIG. 6A specifies that the droplet to be deposited at a target-surface-location corresponding to the (2,1) position is larger than the droplet to be deposited at the target-surface-location corresponding to the (3,1) position.

In the example of FIG. 6A there are two only possible droplet sizes—a smaller droplet specified by a '1' in the digital image matrix and a larger droplet specified by a '2' in the digital image matrix. In other examples, there are more than two possible droplet sizes (e.g. up to 10 droplet sizes).

F) 'nozzle corresponding to a column of the digital image'—as discussed above, first nozzle $Noz_1$ deposits droplets only at locations on the target surface corresponding to positions of the 1s in first column $C_1$ of the matrix $IMG_{FIG.\ 5A}$ of FIG. 5A, the second nozzle $Noz_1$ deposits droplets only at locations on the target surface corresponding to positions of the 1s in second column $C_2$ of the matrix $IMG_{FIG.\ 5A}$ of FIG. 5A, and so on. Thus the $i^{th}$ nozzle $Noz_i$ (i.e. which deposits droplets in the $i^{th}$ column of the grid on the target surface) may be said to correspond to the $i^{th}$ column of matrix $IMG_{FIG.\ 5A}$ of FIG. 5A.

If a nozzle corresponds to a column the digital image IMG, this column of the digital image is said to 'correspond to the nozzle.' Thus, by way of example, nozzle $Noz_1$ of FIG. 5B corresponds to the left-most column $IMG_{FIG.\ 5A}$ of FIG.

5A—thus, the left-most column $IMG_{FIG.\ 5A}$ of FIG. 5A may be said to correspond to nozzle $Noz_1$.

G) 'data-vacant' vs. 'data-occupied/having zero-data' vs. 'having non-zero data'—Consider the value of a halftoned digital image IMG at the position (i,j)—if that value is non-zero (i.e. IMG[i,j]≠0) then (i) the halftoned digital image specifies that a droplet should be deposited (irrespective of size) at a corresponding location on the target surface; and (ii) the digital image IMG is said to have non-zero data at the position (i,j) and (iii) the image is said to be 'data' occupied' at the position (i,j). Thus, 'having non-zero data' at a position is synonymously (and used interchangeably) with 'being data-occupied' at the position.

By way of example, because the image $IMG_{FIG.\ 5A}$ of FIG. 5A has 'zero data' at the position (1,1) and is 'data-vacant' at the position (1,1) (i.e. $IMG_{FIG.\ 5A}$ [1][1]=0), when this image $IMG_{FIG.\ 5A}$ is printed no droplet is deposited on the target surface at a location corresponding to the position (1,1)—indeed, this is visible in FIG. 5B where no droplet (i.e. symbolized by a striped oval) is deposited in the upper-left grid location in the target surface. This is also true for the image $IMG_{FIG.\ 6A}$ of FIG. 6A.

Conversely, because the image $IMG_{FIG.\ 5A}$ of FIG. 5A has 'non-zero data' at the position (10,1) and is 'data-occupied' at the position (10,1) (i.e. $IMG_{FIG.\ 5A}$ [1][1]≠0), when this image $IMG_{FIG.\ 5A}$ is printed a droplet is deposited on the target surface at a location corresponding to the position (10,1)—indeed, this is visible in FIG. 5B where a droplet (i.e. symbolized by a striped oval) is deposited in the upper-right grid location in the target surface.

Comparing the images of FIGS. 5A and 6A, it is clear that (i) the set of data-vacant positions of $IMG_{FIG.\ 5A}$ is identical to the set of data-vacant positions of $IMG_{FIG.\ 6A}$; and the set of data-occupied positions of $IMG_{FIG.\ 5A}$ is identical to the set of data-occupied positions of $IMG_{FIG.\ 6A}$.

H) 'neighboring column'—a neighboring column is an 'immediate neighboring column.' Thus, the first column $C_1$ of $IMG_{FIG.\ 5A}$ has only a single neighboring column—i.e. the second column $C_2$ of $IMG_{FIG.\ 5A}$. The second column $C_2$ of $IMG_{FIG.\ 5A}$ has two neighboring columns on opposite sides of the second column $C_2$ of $IMG_{FIG.\ 5A}$—these two neighboring columns are (i) the first column $C_1$ of $IMG_{FIG.\ 5A}$ and (ii) the third column $C_3$ of $IMG_{FIG.\ 5A}$. The two neighboring columns of the second column $C_2$ are disposed on opposite sides thereof—i.e. the first column $C_1$ of $IMG_{FIG.\ 5A}$ is on the left side of second column $C_2$ and the third column $C_3$ of $IMG_{FIG.\ 5A}$ is on the right side of column $C_2$.

I) 'neighboring position'—an immediate neighbor. A position (i,j) has, by definition, at most four neighboring positions—(i−1,j), (i+1,j), (i,j−1) and (i,j+1).

J) 'column-neighboring position'—a column-neighboring position is both a 'neighboring position' and in a 'neighboring column.' A position (i,j) has, by definition, at most two neighboring positions—(i−1,j), (i+1,j).

K) 'data-moving droplet'—the term 'data-moving droplet' will be defined below.

L) 'nozzle-compensation droplet-size increase'—term 'nozzle-compensation droplet-size increase' will be defined below.

Legend for Data Tables and Related Figures

A significant number of drawings related to data are presented—these drawings present 'original' half-toned data, the printing of this data by droplet deposition and the modification of this data for the purpose of nozzle compensation. In the drawings, three examples of half-toned data are presented: a first example in FIG. 5A (single bit), a second example in FIG. 6A (identical to the example of FIG. 5A with respect to presence/absence of data but specifying droplet size), and a third example in FIG. 6B (single bit—different from the examples of FIGS. 5A and 6A with respect to presence/absence of data).

To avoid confusion, the tables below relate to each example and separately list information relating to each of the First Example (FIG. 5A), the Second Example (FIG. 6A), the Third Example (FIG. 6B), and to examples unrelated to specific half-tone 'original' data set-forth in any of the drawings First Example of Half-Toned Data (FIG. 5A)

Figure 7:
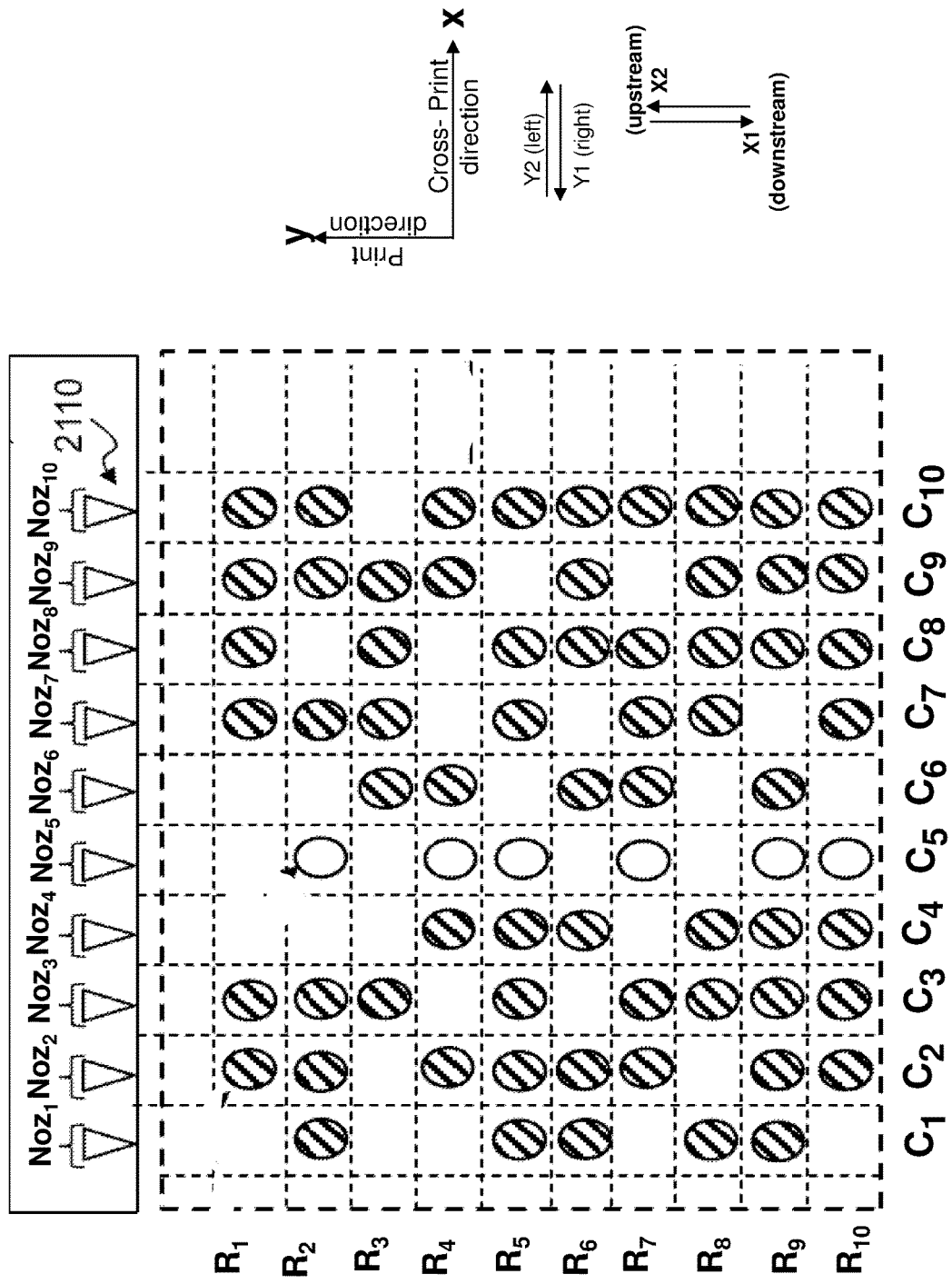
FIG. 7 illustrates one example printing of the digital image of FIG. 5A for a specific case.
Figure 9A:
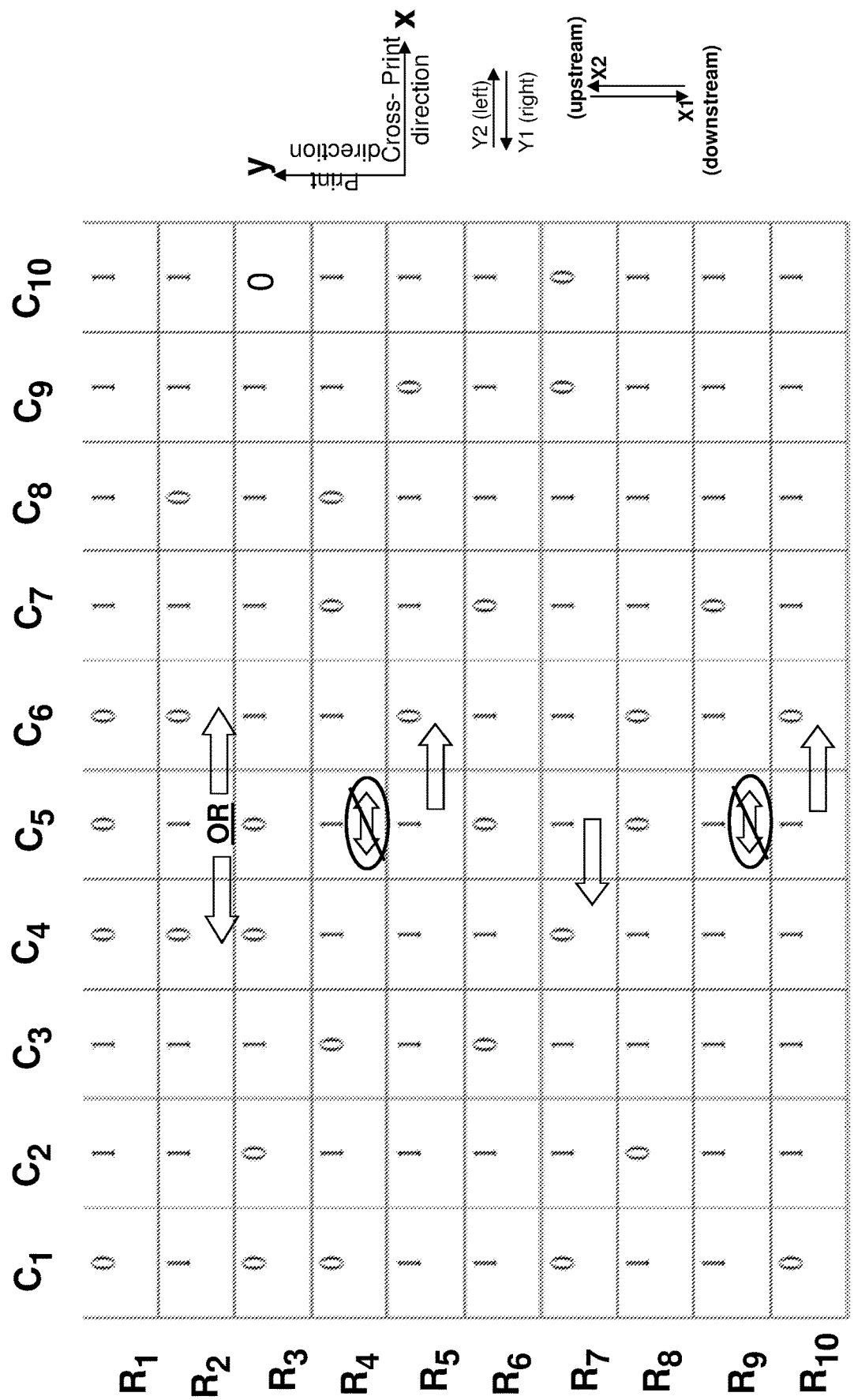
FIG. 9A-9B describes data-moving examples where the half-toned image of FIG. 5A is printed.
Figure 9B:
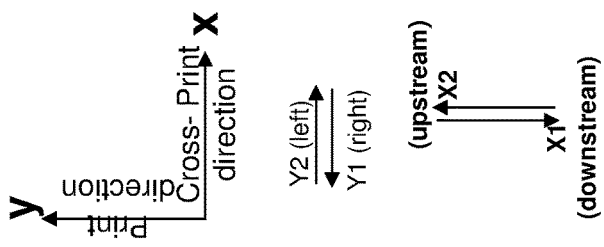
Figure 10A:
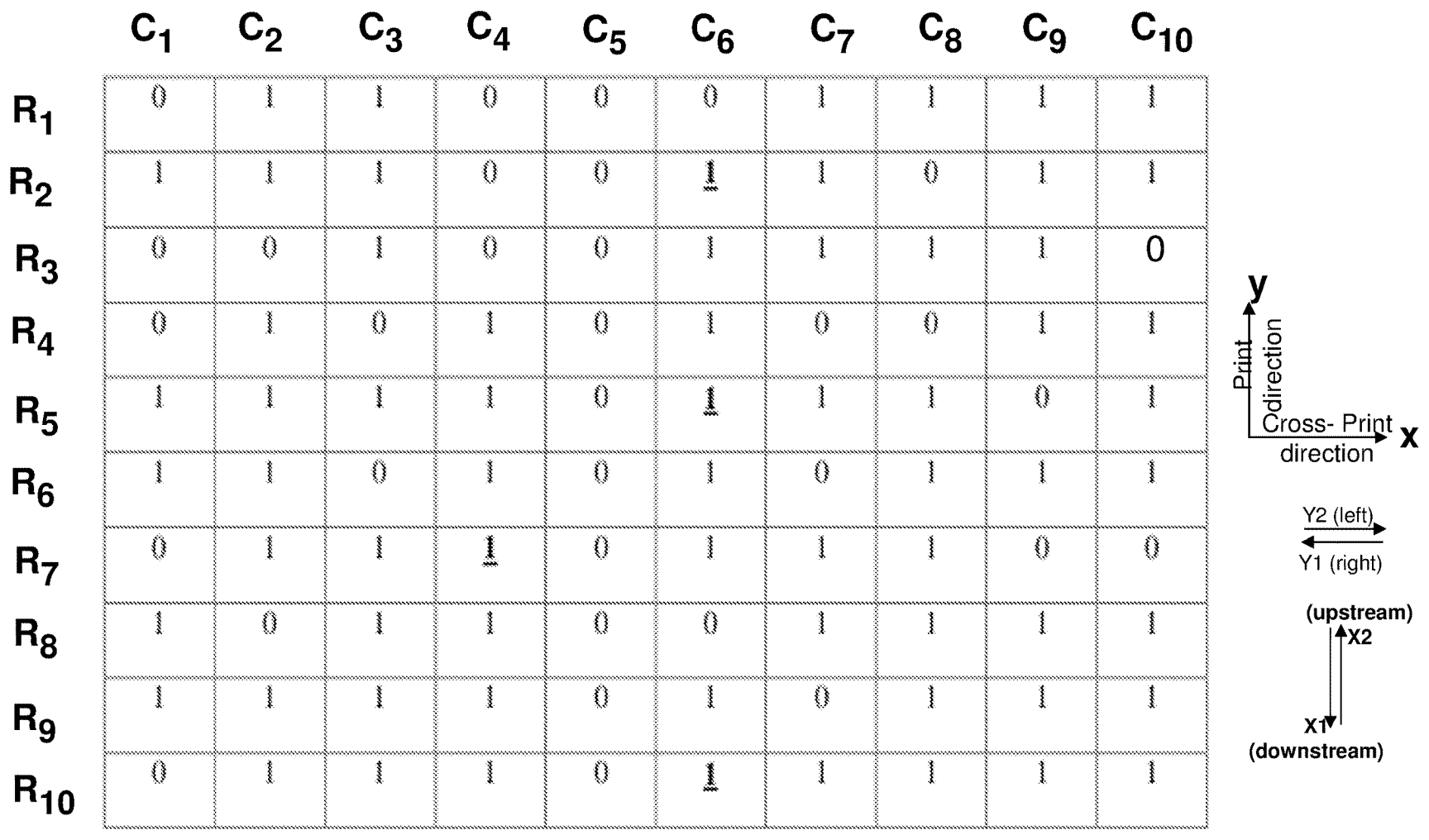
Figure 10B:
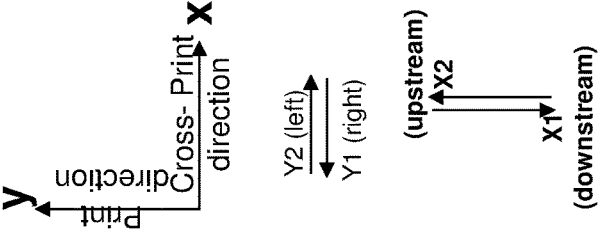
FIG. 10B is like FIG. 10A except instead of starting from the half-toned data of FIG. 5A the original half-toned image is that shown in FIG. 6A.
Figure 11A:
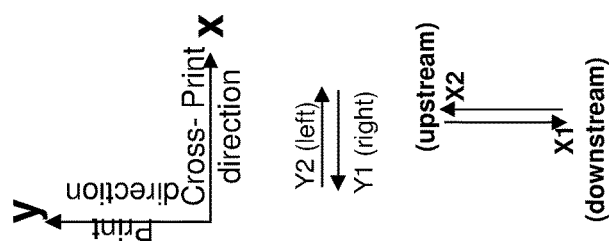
FIGS. 11A and 11B each show 'candidate sets' of positions.
Figure 11B:
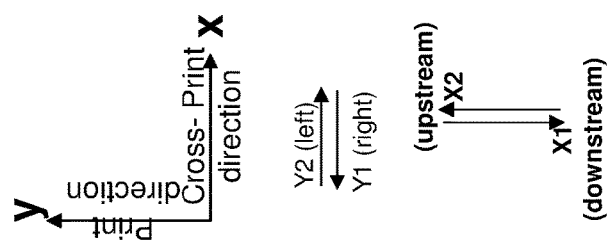
Figure 13A:
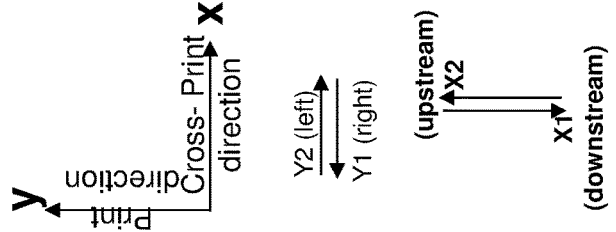
FIG. 13A illustrates how the enforcement of droplet-size increase rules modifies the digital image of FIG. 10A.

| FIG. Number | Description of Contents of the Figure |
|---|---|
| FIG. 5A | Original half-toned data (SINGLE BIT) |
| FIG. 5B | Illustration of droplet deposition of original half-toned data (all nozzles properly functioning) |
| FIG. 7 | Illustration of droplet deposition of original half-toned data (nozzle $Noz_5$ corresponding to column $C_5$ malfunctioning) |
| FIG. 9A | Enforcing data moving rules on the original half-toned data of FIG. 5A using more general rules as applied to the original half-toned data of FIG. 5A. |
| FIG. 9B | Enforcing data moving rules on the original half-toned data of FIG. 5A using more specific rules as applied to the original half-toned data of FIG. 5A) |
| FIG. 10A | Modified half-toned data after the 'more specific' data-moving rules have been enforced on original half-toned data of FIG. 5A |
| FIG. 11A | Illustrations of 'candidate locations' for the data array of FIG. 10A (i.e. after the 'more specific' data-moving rules have been applied to the data of FIG. 5A) for an example where ω > 1 - the 'first set' of candidate locations is in column $C_4$ and the 'second set' of candidate locations is in column $C_6$ |
| FIG. 11B | Illustrations of 'candidate locations' for the data array of FIG. 10A (i.e. after the 'more specific' data-moving rules have been applied to the data of FIG. 5A) for an example where ω > 1 - the 'first set' of candidate locations is in column $C_4$ and the 'second set' of candidate locations is in column $C_6$ |
| FIG. 13A | Enforcement of droplet-size increase rules to modify the digital image of FIG. 10A |

Second Example of Half-Toned Data (FIG. 6A)

Figure 13B:
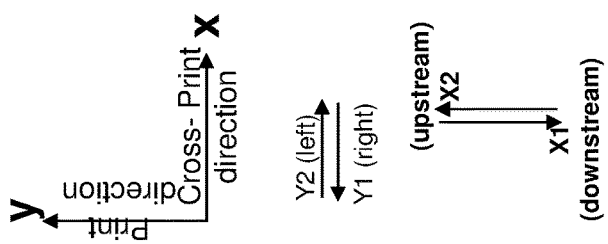
FIG. 13B illustrates how the enforcement of droplet-size increase rules modifies the digital image of FIG. 10B

| FIG. Number | Description of Contents of the Figure |
|---|---|
| FIG. 6A | Original half-toned data (MULTI-BIT) - identical to FIG. 5A with respect to data-occupied and data-vacant positions; in contrast to FIG. 5A, FIG. 6A specifies droplet sizes |
| FIG. 10B | Modified half-toned data after data-moving rules have been enforced (i.e. according to the 'more specific' example of data-moving rules) |
| FIG. 13B | Enforcement of droplet-size increase rules to modify the digital image of FIG. 10B |

Third Example of Half-Toned Data (FIG. 6B)

Figure 9C:
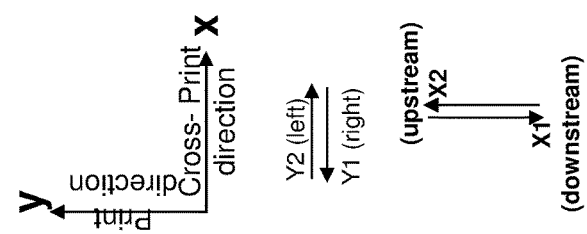
FIG. 9C describes a data-moving example where the half-toned image of FIG. 5B is printed.

| FIG. Number | Description of Contents of the Figure |
|---|---|
| FIG. 6B | Original half-toned data (SINGLE-BIT) |
| FIG. 9C | Enforcing data moving rules on the original half-toned data of FIG. 6B using the 'more specific rules' |

Examples Unrelated to Specific Half-Tone 'Original' Data Set-Forth in any of the Drawings

Figure 14A:
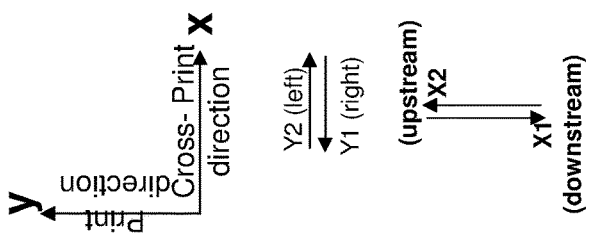
FIG. 14A illustrates candidate positions that are out of phase.
Figure 14B:
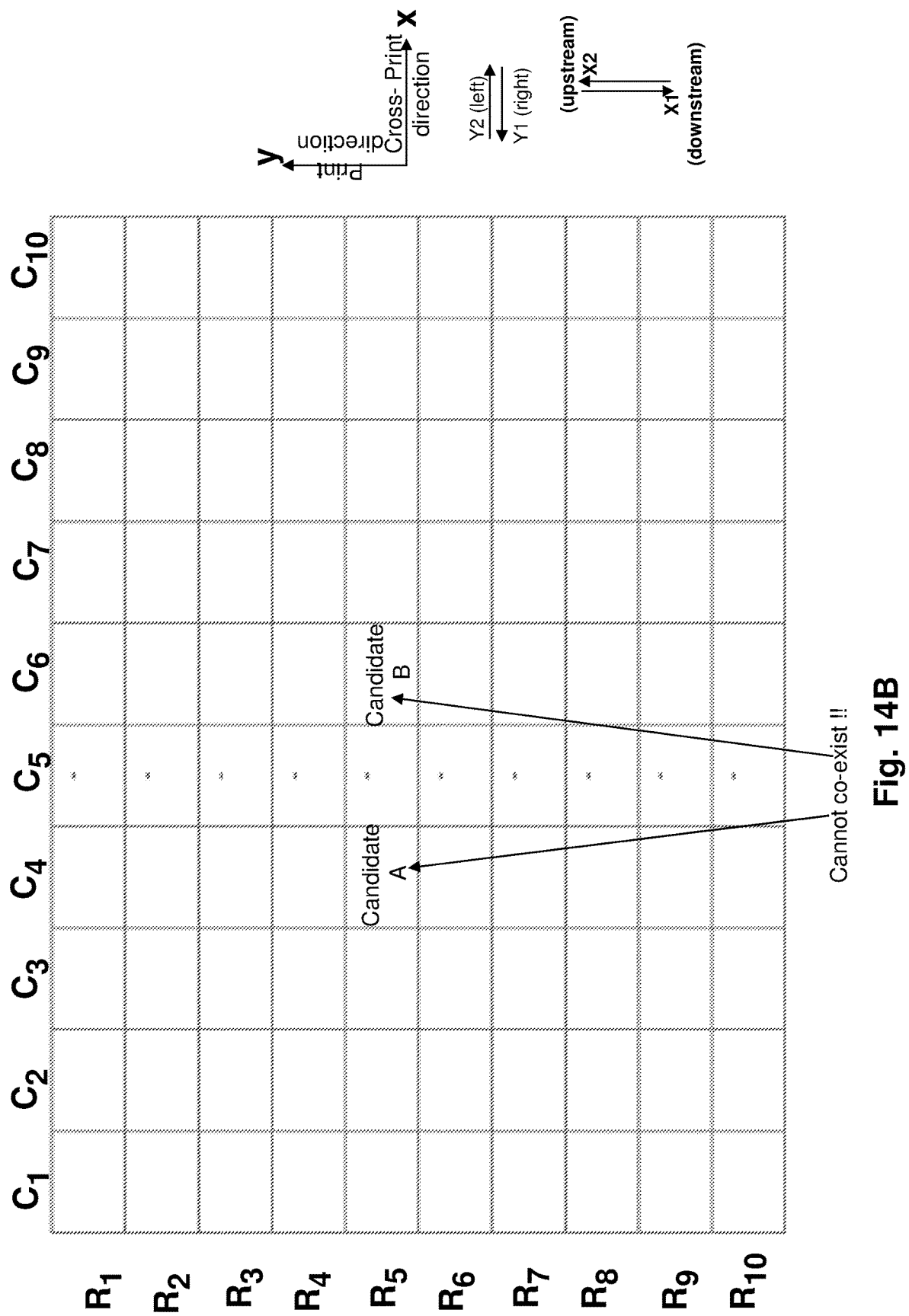
FIG. 14B defines candidate positions on opposite sides of a column.

| FIG. Number | Description of Contents of the Figure |
|---|---|
| FIGS. 14A-14B | Candidate positions - this is completely UNRELATED to the first example (data from FIG. 5A), the second example (data from FIG. 6A) or the third example (data from FIG. 6B) |

A Discussion of FIGS. 7-17

FIG. 7 illustrates one example printing of the digital image of FIG. 5A for the specific case where nozzle $Noz_5$ fails. This is in contrast to the example of FIG. 5B where all nozzles function properly.

FIG. 8 is a flow chart of a method of compensating for or reducing the effect of a malfunctioning or inoperative nozzle.

FIGS. 9A-9B describes data-moving examples where the half-toned image of FIG. 5A is printed.

FIG. 9C describes a data-moving example where the half-toned image of FIG. 5B is printed.

FIG. 10A illustrates the example of FIG. 9B after the data-shifting operations have been performed.

FIG. 10B is like FIG. 10A except instead of starting from the half-toned data of FIG. 5A the original half-toned image is that shown in FIG. 6A.

FIG. 11A shows 'candidate sets' of positions for the situation where the nozzle $Noz_5$ is inoperative—the first candidate set of positions is disposed in the left-neighboring column $C_4$ at a frequency ω=2.0 and the second candidate set of positions is disposed in the right-neighboring column $C_6$ at a frequency w=2.0.

FIG. 11B shows 'candidate sets' of positions for the situation where the nozzle $Noz_5$ is inoperative—the first candidate set of positions is disposed in the left-neighboring column $C_4$ at a 'unity' frequency ω=1 and the second candidate set of positions is disposed in the right-neighboring column $C_6$ at a 'unity' frequency ω=1.

FIG. 12A is a flow chart of a method of nozzle-compensation (e.g. when FM halftoning is used) where both data-moving rules and droplet size-increase rules are enforced. In different embodiments, at least one of the data-moving rules and droplet size-increase rules are enforced.

Figure 12B:
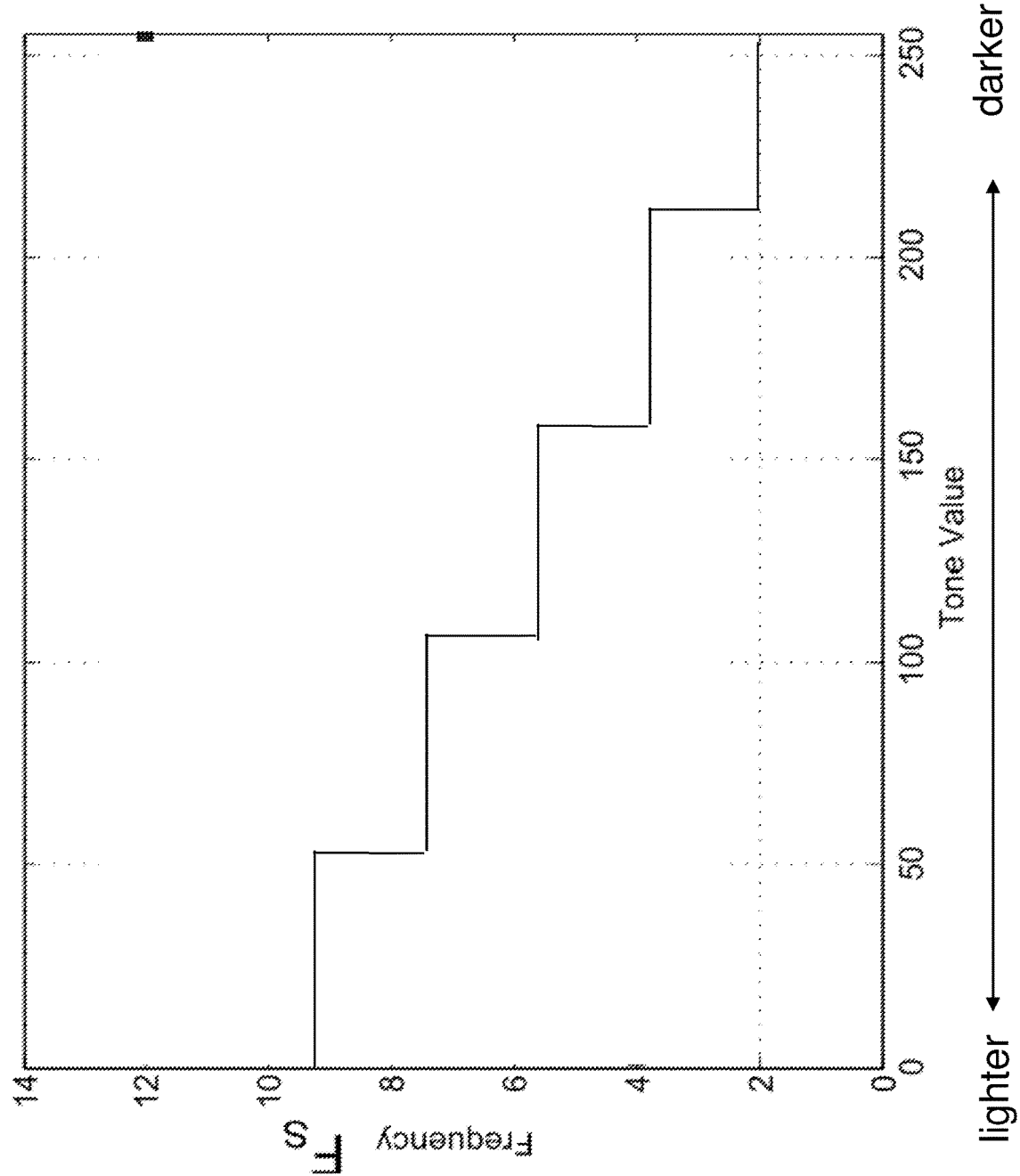
FIG. 12B illustrates a sample relation for determining the frequency ω.

FIG. 12B illustrates a sample relation for determining the frequency ω (e.g. step S129).

FIG. 13A illustrates how the enforcement of droplet-size increase rules modifies the digital image of FIG. 10A.

FIG. 13B illustrates how the enforcement of droplet-size increase rules modifies the digital image of FIG. 10B.

FIG. 14A (identical to FIG. 11) illustrates candidate positions that are out of phase.

FIG. 14B defines candidate positions on opposite sides of a column corresponding to a malfunctioning nozzle that are in the same row.

FIG. 17 is a flow chart of a method of nozzle-compensation (e.g. when AM halftoning is used) where both data-moving rules and droplet size-increase rules are enforced.

Discussion of FIG. 7—Malfunctioning or Failed Dot-Source (e.g. Nozzle)

In both direct and indirect liquid ink-based techniques, the printing system may employ at least one print bar to provide for instance black ink only for the printing of black or grayscale images on the target surface. In color printing, a plurality of print bars (e.g., 3, 4, 8 etc.) may be employed, wherein at least two of the plurality of print bars can provide an ink of a different color. Either way, each print bar typically employs a plurality of printheads (e.g., up to 16, up to 24, or up to 32) that are equipped with a multitude of densely arranged ink ejection nozzles (e.g., up to thousands per print head). Typically, the print heads, which form as well as the print bars what may be referred to as an image forming station, and the image forming surface are in relative motion during the operation of a printing system.

The malfunctioning of a dot source (e.g., clogging of one of the ink ejection nozzles or faulty energy delivery by a LED) may result in one or more of the application of a dot onto the target surface at an abnormal position which is different from a normal position, the application of a dot at a size which is different from the intended dot size, and/or the non-application of halftone dots onto the target surface at times a dot would normally be applied by the same dot source The malfunctioning of a dot source can thus cause the generation of image artifacts, deteriorating image quality. Such image artifacts may for example include white streaks and/or overlaps in the printed image that could be clearly visible by the human naked eye.

FIG. 7 illustrates one example printing of the digital image of FIG. 5A for the specific case where nozzle $Noz_5$ fails. This is in contrast to the example of FIG. 5B where all nozzles function properly.

Comparing FIG. 7 to FIG. 5B, it is clear that despite the fact that the 5th column of $IMG_{5A}$ of FIG. 5A has positions that are data-occupied, no droplets are deposited by the corresponding nozzle $Noz_5$ because it has failed. Because $Noz_5$ (i) is malfunctioning or inoperative (in this specific case, completely failed) corresponds to a 5th column of $IMG_{5A}$, the 5th column of $IMG_{FIG.\ 5A}$ may be said to 'correspond to a malfunctioning or inoperative nozzle.'

In contrast to the example of FIG. 5B where droplets are deposited in the 5th column of the grid on target surface (i.e. at 6 locations where each location corresponds to a data-occupied position in $IMG_{FIG.\ 5A}$), in the example of FIG. 7 no droplets are deposited in the 5th column of the grid on target surface. Thus, as noted above such image artifacts may for example include white streaks—in the example of FIG. 7, a white streak (i.e. aligned with the print direction at the 5th column of the grid on the target surface) would be visible.

Embodiments of the present invention relate to methods and apparatus for correcting for such nozzle malfunctioning.

Techniques for Correcting for Nozzle Malfunctioning (FM Half-Toning)

Embodiments of the present invention relate to a method of nozzle compensation (and related apparatus) for FM-halftoned digital images where (i) data-moving droplets are deposited; and (ii) a size of one or more droplets is increased.

Some additional terms are now defined:

K) 'data-moving droplet'—the term 'data-moving droplet' refers to a droplet that would not have been deposited in the absence of nozzle malfunction or failure, and is deposited (i) when the $i^{th}$ column of an FM half-toned digital image IMG corresponds to a malfunctioning or inoperative nozzle; and (ii) one or more positions within the $i^{th}$ column of an FM half-toned digital image IMG is data-occupied. In response to a determining that a given position (i,j) within a column of the digital image IMG is data-occupied, the data of the given position (i,j) is moved elsewhere. Thus, if in the original digital image IMG, position (i+1,j) is data-vacant (i.e. IMG [i+1][j]=0 indicating that no droplet is to be deposited at a location corresponding to the (i+1,j) position), the droplet that would have been deposited at a location corresponding to the position (i,j) may, instead, by deposited at the location corresponding to the (i+1,j) position. Alternatively, if in the original digital image IMG, position (i−1,j) is data-vacant (i.e. IMG [i−1][j]=0 indicating that no droplet is to be deposited at a location corresponding to the (i−1,j) position), the droplet that would have been deposited at a location corresponding to the position (i,j) may, instead, by deposited at the location corresponding to the (i−1,j) position.

By definition, a data-moving droplet is only deposited at a location corresponding to a position that is data-vacant in the original FM half-toned image.

As will be discussed below, deposition of a data-moving droplet does not only occur for data-occupied positions within the $i^{th}$ column of an FM half-toned digital image IMG corresponds to a malfunctioning or inoperative nozzle In situations where both column-neighboring positions (i−1,j) and (i+1,j) are data-occupied, no data-moving droplet is deposited.

When a data-moving droplet is deposited, this may correspond to shift of data in the digital image—i.e. from a first position (i.e. (i,j)) to one of the neighboring positions.

As will be discussed below with reference to FIG. 17, in contrast to FM-based techniques, when printing an AM half-toned image, a rule is enforced such that no data-moving droplet is ever deposited.

L) nozzle-compensation droplet-size increase—a droplet-size increase can only occur at locations where a droplet is deposited—i.e. corresponding to data-occupied positions in the IMG (i.e. after applying data-moving rules). The term 'nozzle-compensation' droplet-size increase is a droplet-size increase in response to a determining that there is a malfunctioning or inoperative nozzle.

The droplet whose size is increased may be a droplet specified by the original FM half-toned digital image IMG—a droplet corresponding to a data-occupied position within the original FM half-toned digital image IMG. Alternatively, the droplet whose size is increased may be a data-moving droplet that otherwise (i.e. in the absence of a determining of a malfunctioning or inoperative nozzle) would not ordinarily have been deposited.

A Discussion of FIGS. 8 and 9A-9C

FIG. 8 is a flow chart of a method for determining a position corresponding to a location where a data-moving droplet is to be deposited. This may be performed by shifting data.

In the example of FIG. 8, the variable i refers to a column number, and the variable j refers to a row number. In the example of FIG. 8, the $i^{th}$ column of an FM half-toned digital image IMG corresponds to a malfunctioning or inoperative nozzle In the example of FIG. 8, the value i is fixed throughout (i.e. i is a constant) while the value j changes.

The method of FIG. 8 will be explained for the particular example of FIGS. 9A and 9B. FIG. 9A represents an FM half-toned digital image, and the data of FIG. 9A (i.e. 0s and 1s) is identical to the data of FIG. 5A. As will be discussed below, the arrows of FIG. 9A indicate data-shifting operations which causes the deposition of a data-moving droplet.

Similar to the example of FIG. 5B, the example of FIG. 9A corresponds to the case where nozzle $Noz_5$ is inoperative, and thus the 5th column C5 of the digital image of FIG. 9A corresponds to the inoperative nozzle. For the example of FIG. 9A, i is always 5—i.e. i=5.

As stated above, the concept of 'data-shifting' (and thus depositing a data-moving droplet) requires that the position from which the data is shifted be (i) in the $i^{th}$ column of the FM half-toned digital image IMG (i.e. corresponding to a malfunctioning or inoperative nozzle); and (ii) data-occupied. Thus, in the method of FIG. 8, no data may be shifted from a position that is data-vacant in the original FM half-toned digital image IMG.

In step S155, a value of j is set to 1. In step S155, a determination is made if position (i,j) data-occupied—i.e. if IMG[i][j]=0 then the position (i,j) is data-vacant, and if IMG[i][j]≠0 then the position (i,j) is data-occupied). If the (i,j) position is not data-occupied (i.e. data-vacant, step S159), then no data-moving droplet derived from data at the (i,j) position. Referring to FIG. 9A, the 'no branch' from step S155 to step S159 is taken for j=1, j=3, j=6, and j=8, while the 'yes branch' from step S155 to step S163 is taken for j=2, j=4, j=5, j=7, j=9 and j=10.

In step S163, a determination is made if one or both column-neighboring positions are data-vacant—i.e. a determination is at least one of IMG[i−1][j] and IMG[i+1][j] is equal to zero. If both IMG[i−1][j] and IMG[i+1][j] are non-zero, then neither column-neighboring position is data-vacant, and no data-moving droplet derived from data at the (i,j) position is deposited.

Referring to FIG. 9A, the 'no branch' from step S163 to step S159 is taken for j=4 and j=9—as illustrated in FIG. 9A, for j=4 and j=9 even though the (i,j) position is data-occupied, both alternate positions to which data may be shifted from the (i,j) position are 'blocked' since IMG[4][4]=1, IMG[6][4]=1, IMG[4][9]=1, and IMG[6][9]=1.

Referring to FIG. 9A, the 'yes branch' from step S163 to step S117 is taken for j=2, j=5, j=7, and j=10.

In step S117 data is shifted from the (i,j) position to a data-vacant one of the column-neighboring positions (i.e. (i−1,j) or (i+1,j)). Thus, if the left-neighboring position (i−1,j) is data-occupied (i.e. if IMG[i−1,j]≠0), then data is shifted from the position (i,j) to the right-neighboring position (i+1,j), causing the deposition of a data-moving droplet on a location corresponding to the right-neighboring position (i+1,j)—in the example of FIG. 9A, this is the case for j=5 (see the right-arrow) and j=10.

In step S117, if the right-neighboring position (i+1,j) is data-occupied (i.e. if IMG[i+1,j]≠0), then data is shifted from the position (i,j) to the left-neighboring position (i−1,j), causing the deposition of a data-moving droplet on a location corresponding to the left-neighboring position (i−1,j)—in the example of FIG. 9A, this is the case for j=7 (see the left arrow)

In step S117, if both of the left-neighboring position (i−1,j) and the right-neighboring position (i+1,j) are data-vacant (i.e. if both IMG[i−1,j]=0 and IMG[i+1,j]=0), then data may, in theory, be shifted from the position (i,j) either of the left-neighboring position (i−1,j) and the right-neighboring positions (i+1,j)—in the example of FIG. 9A, this corresponds to j=2 where the arrow points in both directions.

The example of FIG. 9B is identical to the example of FIG. 9A, except one of the left direction and the right direction is selected for j=2—in this case, the right direction.

As shown in step S121, S125 and S129 the method returns to step S155 for each value of j within the ith column.

The examples of FIGS. 9A-9B correspond to situations where an attempt is made to print the half-toned image of FIG. 5A. In contrast, FIG. 9C corresponds to situations where an attempt is made to print the half-toned image of FIG. 5B. In the example of FIG. 9C, for situations where the both column-neighbors of a data-occupied position in the 5th column (i.e. corresponding to the malfunctioning or inoperative nozzle) are data-vacant, the direction in which the data is shifted (i.e. to print a data-moving droplet) alternates—in the 2nd row $R_2$ the data is shifted to the left, in the 4th row $R_4$ data is shifted to the left, in the 7th row data is shifted to right, and in the 9th row data is again shifted to the left—this creates a staggered pattern.

It is appreciated that this 'staggered pattern' is relates only to specific embodiments, and is not a limitation for the method.

FIG. 10A illustrates the example of FIG. 9B after the data-shifting operations have been performed. Thus, the position (6,2) which was data-vacant in FIG. 5A is now data-occupied; the position (6,5) which was data-vacant in FIG. 5A is now data-occupied, and so on.

FIG. 10B is like FIG. 10A except instead of starting from the half-toned data of FIG. 5A (i.e. generated in step S105 of FIG. 4 or step S131 of FIG. 12A), in the case of FIG. 10B the original half-toned image is shown in FIG. 6A.

A Discussion of FIGS. 11A-11B, 12A-12B

As discussed above, one way of compensating for a malfunctioning or inoperative nozzle is by deposition of data-moving droplets. In addition, it is possible to compensate for a malfunctioning or inoperative nozzle is by deposition of data-moving droplets subjecting droplets to a size increase, referred to as a 'nozzle-compensation droplet-size increase.'

As discussed above, the "nozzle-compensation droplet-size increase' occurs only at locations where a droplet is deposited.

In some embodiments, the nozzle-compensation droplet size increase (i) only occur in the neighboring columns and is forbidden from occurring elsewhere and (ii) only occurs at a positions that are a member of a 'candidate set' of positions.'

One example of 'candidate sets' of positions for the situation where the nozzle $Noz_5$ is inoperative is shown in FIG. 11A. The first candidate set of positions is disposed in the left-neighboring column $C_4$—in particular, positions of the first candidate set are periodically disposed in the first neighboring column $C_4$ at a frequency 2.0. The second candidate set of positions is disposed in the right-neighboring column $C_6$—in particular, positions of the second candidate set are also periodically disposed in the second neighboring column $C_6$ at a frequency $\omega=2.0$.

In the example of FIG. 11A, a value of the frequency exceeds 1—in other example, if a value of the frequency is exactly 1 (i.e. $\omega=1$), then every position in the left-neighboring and right-neighboring column is a member of the first candidate-set or second candidate-sets of positions.

In FIG. 11B, another example is shown—in this example, the frequency is unity.

FIG. 12A is a flow chart of a method of nozzle-compensation when the half-toned image IMG is FM half-toned (e.g. generated in step S105 by an FM half-toning). In step S129 a frequency $\omega$ is selected—e.g. the frequency co may be selected heuristically and/or 'dynamically'. For example, the frequency $\omega$ may be selected according to tone value (e.g. in a location of a data column corresponding to a malfunctioning nozzle—e.g. according to the relation illustrated in FIG. 12B and discussed below.). In the example of FIG. 11B, the greater the tone value (i.e. indicating darker) the lower the frequency (i.e. for darker regions droplet-size-increase may be required more frequently to compensate), while the lower the tone value (i.e. indicating lighter) the greater the frequency.

The skilled artisan that the order of steps is not limiting—for example, step S129 may be performed at a later stage but before step S143. In some examples, the frequency In step S131 of FIG. 12A, a gray-scale image is subjected to FM half-toning—this is equivalent to one specific example of step S105 of FIG. 4. If no nozzle malfunction or failure is detected (step S135), convention techniques for printing (i.e. no need for nozzle correction) may be employed in step S137. In non-limiting embodiments, the detection of malfunctioning nozzles is performed according to techniques described below with reference to FIGS. 16A-16B. However, this is not a limitation and other techniques including but not limited to any conventional technique known in the art may be employed.

Otherwise, at least one or at least two or all three of the three following data-moving rules in step S139 is applied:

i. according to the first data-moving rule, whenever a given position (i,j) within the $i^{th}$ column of the FM half-toned digital image IMG is data-occupied, at most one data-moving droplet is deposited on the target surface. Thus, in the example of FIGS. 9A-9B, for the malfunctioning column $C_5$, only the following rows are data-occupied: $R_2$, $R_4$, $R_5$ $R_7$, $R_9$, and $R_{10}$. In the example of FIGS. 9A-9B, (i) only a single data-moving droplet is deposited in response to malfunction of the nozzle in column $C_5$ and a presence of data in row $R_2$ (in FIG. 9B this data-moving droplet is deposited at position (6,2)); (ii) no data-moving droplet is deposited in response to malfunction of the nozzle in column $C_5$ and a presence of data in row $R_4$; only a single data-moving droplet is deposited in response to malfunction of the nozzle in column $C_5$ and a presence of data in row $R_5$ (in FIG. 9B this data-moving droplet is deposited at position (6,5)); (iv) only a single data-moving droplet is deposited in response to malfunction of the nozzle in column $C_5$ and a presence of data in row $R_7$ (in FIG. 9B this data-moving droplet is deposited at position (6,7)); (v) no data-moving droplet is deposited in response to malfunction of the nozzle in column $C_5$ and a presence of data in row $R_9$; and (vi) only a single data-moving droplet is deposited in response to malfunction of the nozzle in column $C_5$ and a presence of data in row $R_{10}$ (in FIG. 9B this data-moving droplet is deposited at position (6,10)). In all cases, in the example of FIGS. 9A-910 at most one data-moving droplet is deposited whenever a given position (i,j) within the $i^{th}$ column of the FM half-toned digital image IMG is data-occupied.

ii. according to the second data-moving rule, this data-moving droplet is only deposited if one or both of the column-neighboring positions (i.e. one or both of the positions (i−1,j) and (i+1,j)) is data-vacant. In the example of FIG. 9A, for row 4 both neighboring positions (i.e. position (4,4) and positions (6,4)) are data-occupied—therefore, in accordance with the second data-moving rule no data moving droplet is provided for position 5,4 (which is data-occupied in a column corresponding to the malfunctioning or inoperative nozzle);

iii. according to the third data-moving rule, if deposited, the data-moving droplet is only deposited at a location corresponding to one of the column-neighboring positions that is data-vacant in the source half-toned image generated in step S131 (consider the example of FIG. 9B where the source half-toned image is in FIG. 5A—in row 2 of FIG. 9B, the data-moving droplet is provided in either neighbor (i.e. column 4 or column C6) which is data-vacant in FIG. 5A, in row R5 of FIG. 9B the data-moving droplet is provided in column $C_6$ which is data-vacant in FIG. 5A, in row 7 of FIG. 9B the data-moving droplet is provided in column C4 which is data-vacant in FIG. 5A, and in row 10 of FIG. 9B the data-moving droplet is provided in column $C_6$ which is data-vacant in FIG. 5A.

In step S143 of FIG. 12A, the candidate positions are determined—e.g. those in FIG. 10. In step S147, within the left C4 and right C6 neighboring columns, droplet sizes are only increased at the candidate positions and only are increased for candidate positions that are data-occupied after enforcing the data-moving rule.

In step S149 of FIG. 12A, the modified half-toned image (i.e. different from the original half-toned image of step S131) is printed. Steps S143-149 of FIG. 12A may be performed to enforce the following rule (i.e. droplet-size-increase-rule)—a deposited droplet is subjected to nozzle-compensation droplet-size increase if and only if the deposited droplet (i) corresponds to a position belonging to the first candidate-set of positions (i.e. all positions of the first candidate-set of positions are in the left neighboring column—when column C5 corresponds to the malfunctioning nozzle, the left neighboring column is C4) or (ii) corresponds to a position belonging to the second candidate-set of positions (i.e. all positions of the second candidate-set of positions are in the right neighboring column—when column C5 corresponds to the malfunctioning nozzle, the right neighboring column is C6). Non-limiting examples of 'first' and 'second' candidate-sets of positions are discussed below, with reference to FIGS. 13-14.

FIG. 12B illustrates an example relation between tone value (e.g. as computed from an input gray-scale) and frequency $F_S$ ($F_S$ is interchangeable with ω) determined in step S129. In this example, (i) the darker the tone value, the lower the frequency $F_S$ and (ii) the lighter the tone value, the higher the frequency $F_S$. As discussed above, the frequency ω (e.g. determined according to the relation of FIG. 9B) is then employed in step S143.

A Discussion of FIG. 13A

FIG. 13A relates to the example of FIG. 10A. In particular, FIG. 10A shows how the data-moving rules modify the original half-toned digital image of FIG. 5A. FIG. 13A shows how the droplet-size increase rules modify the digital image of FIG. 10A where the first candidate-set of positions within the FM half-toned digital image IMG is shown in FIG. 11 (frequency ω=2—column C4) and the second candidate-set of positions within the FM half-toned digital image IMG is also shown in FIG. 11 (frequency ω=2—column C6).

The candidate positions of the first set of candidate positions are as follows: {(4,1), (4,3), (4,5), (4,7), (4,7)}. The candidate positions of the second set of candidate positions are as follows: {(6,2), (6,4), (6,6), (6,7), (6,10)}. At all positions other than those of the first and second sets of candidate positions, all values of the image of FIG. 13A are identical to the values of the image of FIG. 10A—i.e. there is no droplet-size-increase for any location corresponding to a position that is not within the first or second sets of candidate positions.

IMG[4][1]=0 of FIG. 13A is equal to IMG[4][1]=0 of FIG. 10A—i.e. no droplet-size increase because no droplet is deposited at a location corresponding to the position (4,1).

IMG[4][3]=0 of FIG. 13A is equal to IMG[4][3]=0 of FIG. 10A—i.e. no droplet-size increase because no droplet is deposited at a location corresponding to the position (4,3).

IMG[4][5]=2 of FIG. 13A which exceeds IMG[4][5]=1 of FIG. 10A—i.e. a droplet size is increases from 'size 1' to 'size 2' for a location corresponding to the position (4,5).

IMG[4][7]=2 of FIG. 13A which exceeds IMG[4][7]=1 of FIG. 10A—i.e. a droplet size is increases from 'size 1' to 'size 2' for a location corresponding to the position (4,7).

IMG[4][9]=2 of FIG. 13A which exceeds IMG[4][9]=1 of FIG. 10A—i.e. a droplet size is increases from 'size 1' to 'size 2' for a location corresponding to the position (4,9).

IMG[6][2]=2 of FIG. 13A which exceeds IMG[6][2]=1 of FIG. 10A—i.e. a droplet size is increases from 'size 1' to 'size 2' for a location corresponding to the position (6,2).

IMG[6][4]=2 of FIG. 13A which exceeds IMG[6][4]=1 of FIG. 10A—i.e. a droplet size is increases from 'size 1' to 'size 2' for a location corresponding to the position (6,4).

IMG[6][6]=2 of FIG. 13A which exceeds IMG[6][6]=1 of FIG. 10A—i.e. a droplet size is increases from 'size 1' to 'size 2' for a location corresponding to the position (6,6).

IMG[6][8]=0 of FIG. 13A is equal to IMG[6][8]=0 of FIG. 10A—i.e. no droplet-size increase because no droplet is deposited at a location corresponding to the position (6,8).

IMG[6][10]=2 of FIG. 13A which exceeds IMG[6][10]=1 of FIG. 10A—i.e. a droplet size is increases from 'size 1' to 'size 2' for a location corresponding to the position (6,10).

A Discussion of FIG. 13B

FIG. 13A illustrates how the enforcement of droplet-size increase rules modifies the digital image of FIG. 10A (i.e. which corresponds to the 'original image' of FIG. 5A after modification). In contrast, FIG. 13B illustrates how the enforcement of droplet-size increase rules modifies the digital image of FIG. 10B (i.e. which corresponds to the 'original image' of FIG. 6A after modification).

Thus, FIG. 13B relates to the example of FIG. 10B. In particular, FIG. 10B shows how the data-moving rules modify the original half-toned digital image of FIG. 6A. FIG. 13B shows how the droplet-size increase rules modify the digital image of FIG. 10B where the first candidate-set of positions within the FM half-toned digital image IMG is shown in FIG. 11 (frequency ω=2—column C4) and the second candidate-set of positions within the FM half-toned digital image IMG is also shown in FIG. 11 (frequency ω=2—column C6).

The candidate positions of the first set of candidate positions are as follows: {(4,1), (4,3), (4,5), (4,7), (4,7)}. The candidate positions of the second set of candidate positions are as follows: {(6,2), (6,4), (6,6), (6,7), (6,10)}. At all positions other than those of the first and second sets of candidate positions, all values of the image of FIG. 13B are identical to the values of the image of FIG. 10A—i.e. there is no droplet-size-increase for any location corresponding to a position that is not within the first or second sets of candidate positions.

IMG[4][1]=0 of FIG. 13B is equal to IMG[4][1]=0 of FIG. 10B—i.e. no droplet-size increase because no droplet is deposited at a location corresponding to the position (4,1).

IMG[4][3]=0 of FIG. 13B is equal to IMG[4][3]=0 of FIG. 10B—i.e. no droplet-size increase because no droplet is deposited at a location corresponding to the position (4,3).

IMG[4][5]=3 of FIG. 13B which exceeds IMG[4][5]=1 of FIG. 10B—i.e. a droplet size is increases from 'size 1' to 'size 3' for a location corresponding to the position (4,5) (e.g. according to a policy of some embodiments, whereby when droplet size is increased, the droplet size is increased to the maximum possible size).

IMG[4][7]=3 of FIG. 13B which exceeds IMG[4][7]=1 of FIG. 10B—i.e. a droplet size is increases from 'size 1' to 'size 3' for a location corresponding to the position (4,7).

IMG[4][9]=3 of FIG. 13B which exceeds IMG[4][9]=2 of FIG. 10B—i.e. a droplet size is increases from 'size 2' to 'size 3' for a location corresponding to the position (4,9).

IMG[6][2]=3 of FIG. 13B which exceeds IMG[6][2]=1 of FIG. 10B—i.e. a droplet size is increases from 'size 1' to 'size 3' for a location corresponding to the position (6,2).

IMG[6][4]=3 of FIG. 13B which exceeds IMG[6][4]=2 of FIG. 10B—i.e. a droplet size is increases from 'size 2' to 'size 3' for a location corresponding to the position (6,4).

IMG[6][6]=3 of FIG. 13B which exceeds IMG[6][6]=1 of FIG. 10B—i.e. a droplet size is increases from 'size 1' to 'size 3' for a location corresponding to the position (6,6).

IMG[6][8]=0 of FIG. 13B is equal to IMG[6][8]=0 of FIG. 10B—i.e. no droplet-size increase because no droplet is deposited at a location corresponding to the position (6,8).

IMG[6][10]=3 of FIG. 13B which exceeds IMG[6][10]=1 of FIG. 10B—i.e. a droplet size is increases from 'size 1' to 'size 3' for a location corresponding to the position (6,10).

FIG. 14A is identical to FIG. 11 and shows that, in some embodiments, when the frequency exceeds to ω1, the candidate positions are 'out of phase'—even though the periodicity/frequency in columns C4 and C6 are the same, there is phase-shift between the candidate positions. For example, in some embodiments and as shown in FIG. 14B, candidate positions in the left-neighbor column must all be in different rows from all of the candidate positions in the right-neighbor column—e.g. the configuration as shown in FIG. 14B is forbidden (i.e. according to this particular embodiment).

Figure 15:
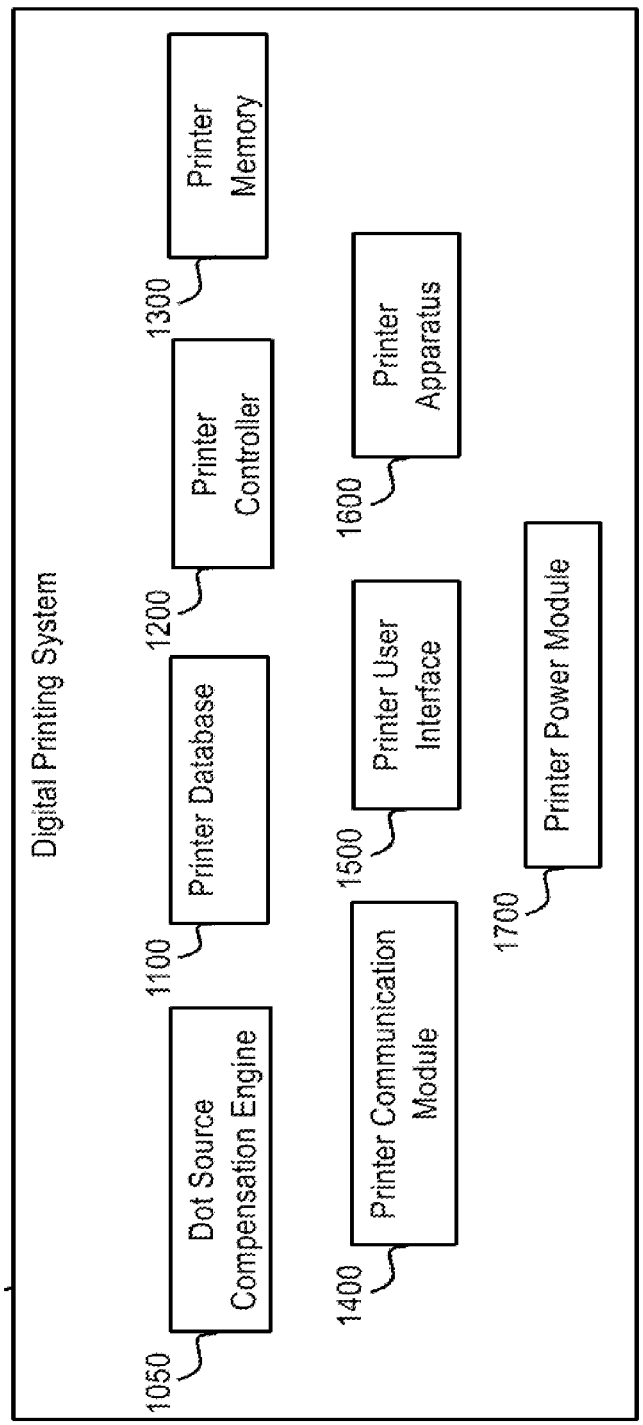
FIG. 15 is a block diagram of a digital printing system.
Figure 16A:
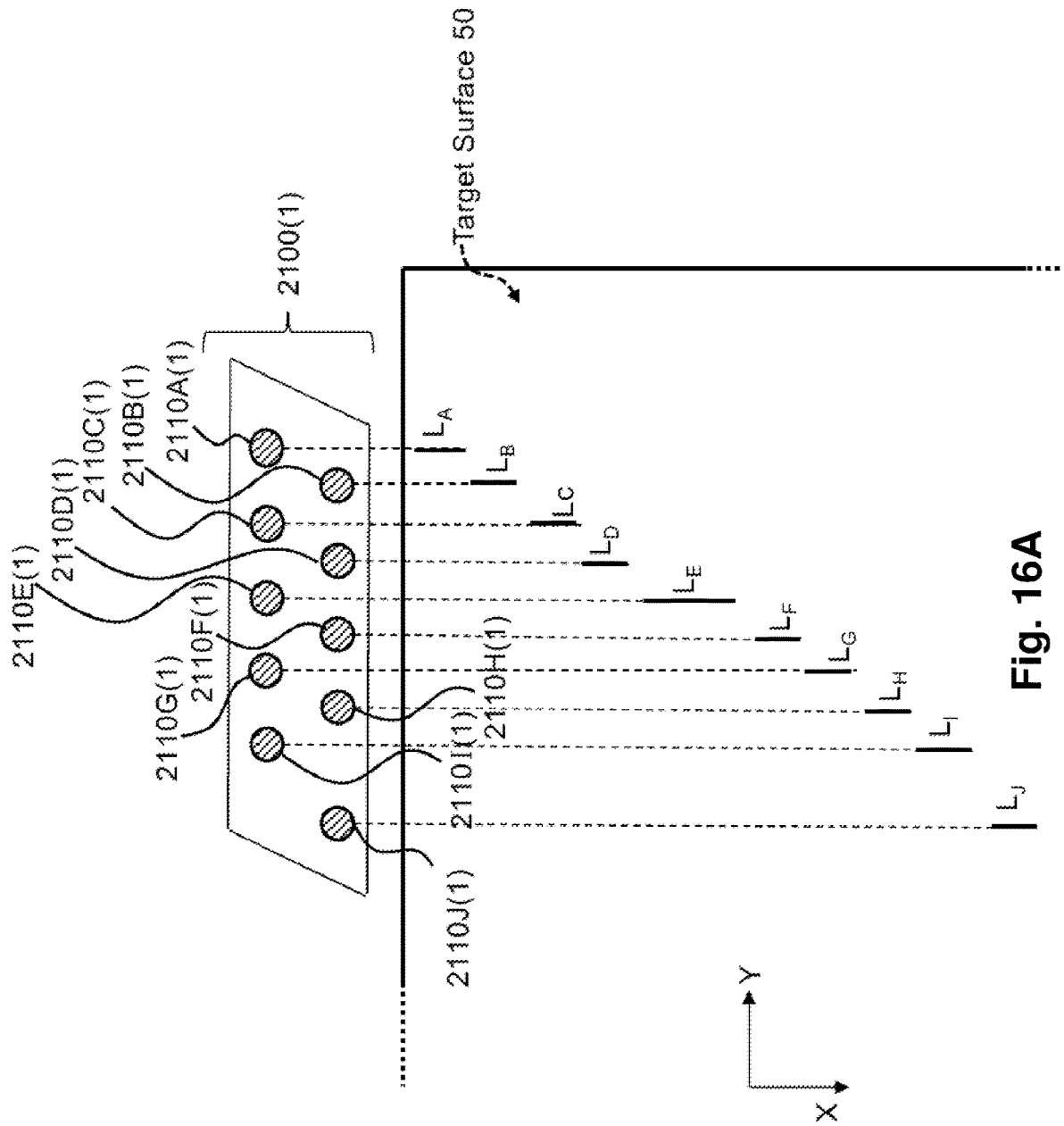
FIGS. 16A-16B illustrate the printing of a reference test patterns.
Figure 16B:
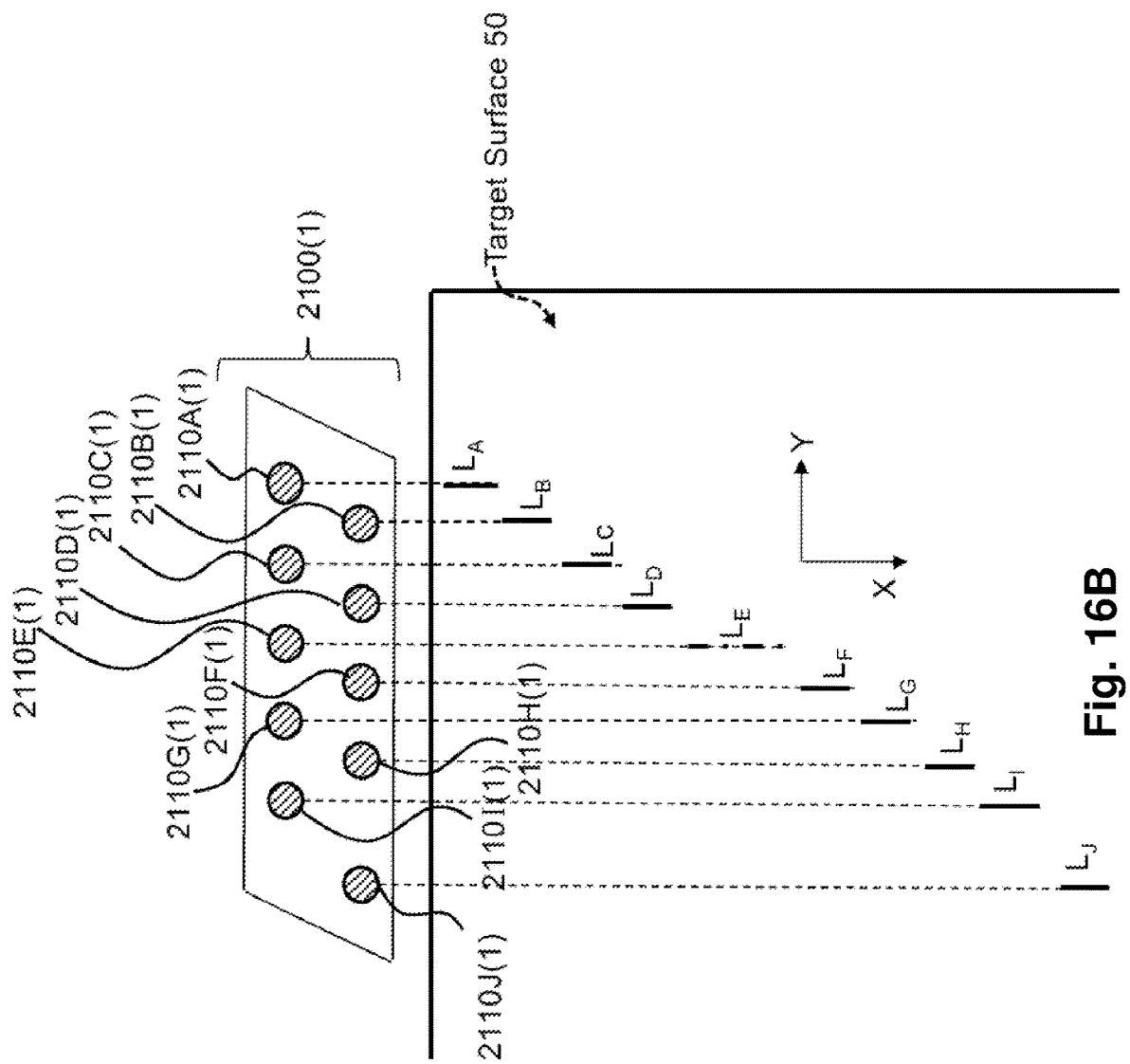

A Discussion of FIGS. 15 and 16A-16B

Reference is made to FIG. 15. A digital printing system 1000 may in some embodiments be operative to enable the implementation of a method to execute compensation for a malfunctioning image dot source. Such method may herein be implemented by and/or referred to as a "dot source compensation engine", which may be schematically illustrated in FIG. 15 as a block referenced by alphanumeric label "1050". Compensation Engine 1050 may be realized by one or more hardware, software and/or hybrid hardware/software modules, e.g., as outlined herein. The present disclosure may thus, inter alia, be concerned with the implementation of dot source compensation engine or dot source compensation module 1050 which may allow a printing system, such as system 1000, to address and overcome the problems associated with malfunctioning dot sources, as described in more details below.

As shown schematically in FIG. 15, digital printing system 1000 may in some embodiments include a printer database 1100, a printer controller 1200, a printer memory 1300, a printer communication module 1400, a printer user interface 1500, a printer apparatus 1600 and a printer power module 1700 for enabling the powering of the various components of system 1000. The various components of digital printing system 1000 may communicate with each other over one or more communication buses (not shown) and/or signal lines (not shown).

A database such as printer database 1100 may for example relate to one or more servers, storage systems and/or cloud-based systems and may be employed for storing digital input image data 10.

The term "controller" as used herein may additionally or alternatively refer to a processor or central processing unit (CPU). A controller (e.g., printer controller 1200) and/or processor may relate to various types of processors and/or processor architectures including, for example, embedded processors, communication processors, graphics processing unit (GPU)-accelerated computing, soft-core processors and/or embedded processors.

A memory such as printer memory 1300 may include one or more types of computer-readable storage media like, for example, transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache or flash memory. As working memory, printer memory 1300 may, for example, process temporally-based instructions. As long-term memory, printer memory 1300 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, and the like. For the purposes of long-term storage, data fragments may be stored on such long-term memory.

Printer communication module 1400 may allow receiving data from a source which may be external of digital printing system 1000. Printer communication module 1400 may, for example, include I/O device drivers (not shown) and/or network interface drivers (not shown). A device driver may for example, interface with a keypad or to a USB port. A network interface driver may for example execute protocols for the Internet, or an Intranet, Wide Area Network (WAN), Local Area Network (LAN) employing, e.g., Wireless Local Area Network (WLAN), Metropolitan Area Network (MAN), Personal Area Network (PAN), extranet, 2G, 3G, 3.5G, 4G including for example Mobile WIMAX or Long Term Evolution (LTE) advanced, Bluetooth®, ZigBee™ and/or any other current or future communication network, standard, and/or system.

According to some embodiments, printer memory 1300 may include instruction (not shown) which, when executed by printer controller 1200, may cause the execution of methods, processes and/or operations for compensating for a malfunctioning dot source, as outlined herein below in greater detail. As already indicated herein, such method, process and/or operation may herein be implemented by and/or referred to as dot source compensation engine or, simply, compensation engine 1050.

It is noted that the term "dot source compensation" as well as grammatical variations thereof, may encompass any procedures executed by, e.g., compensation engine 1050, that result in avoiding, or at least in diminishing visually observable deviations from an image which would normally be provided onto the target surface if none of the digital printing system's image dot sources were malfunctioning. It may alternatively be referred to as "nozzle compensation".

In some embodiments, a malfunctioning image dot source may comprise an ink ejection nozzle that does not eject ink as desired and, for example, print in an unevenly, sputtering, weak, spraying, scattering and/or wobbling manner, and/or a nozzle that prints alternatingly in different directions or angles (also dubbed "deviating" nozzle), a nozzle that is fully clogged or partially clogged, and/or any otherwise not correctly functioning nozzle. In some embodiments, a malfunctioning image dot source may comprise a LED that does not apply, as desired, the energy on the print drum or belt as it moves past the LEDs.

Some Examples of Detecting a Malfunctioning of Inoperative Nozzle (or Other Dot Source)

According to some embodiments, a method for compensating for a malfunctioning dot source may include procedures for determining the operational state of the dot source. Determining the state of an image dot source may include obtaining data descriptive of a reference test pattern. Such data may herein be referred to as "reference-test-patterndata". The reference-test-pattern-data may be, for example, descriptive of specially designed and arranged lines to be provided onto the target surface. Each line may be singularly mapped with a dot source of, e.g., a printhead or LED chip.

Identifying a malfunctioning dot source may further include providing an output command to the dot source of the printing system to provide the reference test pattern onto the target surface. As a result, a pattern is applied or deposited on the target surface, which may be an ITM or a printing substrate. The command to provide the reference test pattern may be given separately from the images that are applied as part of a regular printing job.

The malfunctioning image dot source detection procedures method may further include optically reading the applied pattern (e.g., on-line or off-line image acquisition) to obtain actual-applied-data, descriptive of the dot patterns actually applied onto the target surface.

The actual-applied-data may then be compared against the reference-test-pattern-data. Each image dot source is singularly mapped with a line to be applied as per the reference-test-pattern-data. Thus, a comparison between the actual-test-pattern-data against the reference-test-pattern-data may result in comparison-data descriptive of the state of each image dot source and, in applicable, in the identification of a malfunctioning image dot source. Optionally, the type of fault of the image dot source may be identified as well.

Further reference is made to FIGS. 16A and 16B. As already briefly outlined herein above, the system and method may be operable to detect the state of an image dot source such as an ink ejection nozzle of printheads 2100. The state of an image dot source may be determined by obtaining data about an image dot source being examined. The dot source data may, inter alia, be descriptive of information about dot source's position (e.g., the position of the ink ejection nozzle in printhead 2100), and whether the image dot source operates normally or not (i.e., whether the examined image dot source is malfunctioning). In the event the image dot source is identified as malfunctioning, the dot source data may also be descriptive of information about the type of fault such as, for instance, whether an examined dot source is providing dot in an unevenly, spraying, sputtering, scattering, wobbling or weak manner, and/or if the dot source applies dots alternatingly in different directions or angles, and/or whether the dot source (e.g., an ink ejection nozzle) is clogged, and/or otherwise not functioning normally. In embodiments where, for the same printhead, two adjacent dot sources responsible for the application of neighbouring dot sources are identified as being malfunctioning, no compensation may be invoked. Optionally, an output may be provided to the operator of the printing system that the corresponding printhead has to be replaced.

According to some embodiments, image dot source data may be obtained by providing an output command to dot sources (e.g., ink ejection nozzles 2110 of printer apparatus 1600) to generate (e.g., ink-jet print) a reference test pattern on target surface 50. Data descriptive of such reference test pattern is schematically shown in FIG. 16A. The command to generate the reference test pattern may be given separately from the dots provided as part of a regular printing job.

According to some embodiments, the reference test pattern may be print lines (e.g., lines $L_A$-$L_J$) arranged, e.g., in a staircase pattern in correspondence with the ink ejection nozzles. Accordingly, when correctly printed by digital printing system 1000, the reference staircase pattern would be formed on target surface 50, each line of the reference test pattern substantially solidly printed and uniquely mapped with an ink image dot source (e.g., ejection nozzle 2110) and identifiably as such by dot source compensation engine 1050 introduced in the description to FIG. 15.

By comparing the printing result of the applied or printed pattern shown schematically in FIG. 16B, with the reference test pattern illustrated in FIG. 16A, the state of each image dot source can be determined. According to some embodiments, comparing between the reference test pattern and the applied or printed image pattern may include optically reading the applied or printed pattern to obtain actual-applied-data, which is descriptive of the applied dot patterns. The data (actual-applied-data) descriptive of the printed pattern may then be compared by dot source compensation engine 1050 against the data (reference-test-pattern-data) descriptive of the reference test pattern. Since each image dot source is singularly mapped with an ink line to be provided onto target surface 50 as per the reference-test-pattern-data, a comparison between the actual applied data against the reference test pattern data may result in comparison-data descriptive of the state of each nozzle. Additionally or alternatively, the state of an ink ejection nozzle may be determined by visual observation, e.g., using the "human naked eye".

For example, when an ink ejecting nozzle is malfunctioning, the resulting printed pattern may not fully correspond to the data descriptive of the reference test pattern. Since as shown in FIG. 16B ink ejection nozzle 2110E(1) prints line $L_E$ in "dash-dot" manner as opposed to a solid line shown in FIG. 16A, nozzle 2110E(1) may be identified as being malfunctioning, e.g., by dot source compensation engine 1050. Clearly, the faulty "dash-dot" printing pattern is not the only kind of malfunction that may be associated with an ink ejection nozzle. As already indicated herein above, a faulty nozzle may print in deviating directions for example.

Information as to the state of malfunctioning nozzle 2110E(1) may be input to printer apparatus 1600, manually or automatically.

It may be desirable that a malfunctioning dot source (e.g., ink ejection nozzle) should not be used. Hence, dot source compensation engine 1050 may render the malfunctioning nozzle non-operable, e.g., by modifying, the screened image data generated based on the input image data, such that in either case no print command is sent to the malfunctioning nozzle.

According to some embodiments, the method for compensating for a malfunctioning image dot source may further include rendering the malfunctioning image dot source non-operative (e.g., by modifying the FM or AM-screened or hybrid AM-FM screened image data generated based on the input image data, such to that no print command is sent to the malfunctioning nozzle). Such image dot source may herein be referred to as "non-operative image dot source" or, analogously "non-operative ink ejection nozzle" or "non-operative LED". As already outlined herein, the pixel column which is not printed due to such non-operative image dot source may be referred to as "non-printed pixel column".

A Discussion of FIG. 17—Nozzle Compensation for AM Screening

FIG. 17 shows a method for nozzle compensation when the half-toning is an AM half-toning. Thus, in contrast to step S131 of FIG. 12A, in step S231 of FIG. 17 the half-toning is an AM half-toning.

As stated above, in some embodiments, step S129 is performed 'dynamically'—i.e. according to the contents of the image to be printed (e.g. according to tone value). In some embodiments, step S229 is performed in a manner that is 'fixed' or insensitive to the tone value of the image to be printed.

The data-moving rule of S239 of FIG. 17 is different from the data-moving rule of step S139 of FIG. 12A. In particular, the data-moving rule is that no data-moving droplet is ever deposited.

CONCLUDING REMARKS

Unless otherwise stated, the use of the expression "and/or" between the last two members of a list of options for selection indicates that a selection of one or more of the listed options is appropriate and may be made.

In the discussion, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

Where applicable, although state diagrams, flow diagrams or both may be used to describe embodiments, the technique is not limited to those diagrams or to the corresponding descriptions. For example, flow need not move through each illustrated box or state, or in exactly the same order as illustrated and described While this disclosure has been described in terms of certain embodiments and generally associated methods, alterations and permutations of the embodiments and methods will be apparent to those skilled in the art. The disclosure of the invention is to be understood as not limited by the specific embodiments described herein, but only by the scope of the appended claims.

What is claimed is:

1. A method of compensating for or reducing the effect of a malfunctioning or inoperative nozzle $Noz_i$ corresponding to the $i^{th}$ column of a half-toned digital image IMG that specifies, for each position (i,j) of the digital image whether or not a droplet is to be deposited at a corresponding location on a target surface, the $i^{th}$ column having first (i.e. $(i-1)^{th}$ column) and second (i.e. $(i+1)^{th}$ column) neighboring columns disposed on opposite sides of the $i^{th}$ column, the method comprising:
   a. establishing a frequency for droplet-size increase such that for a target portion of an image that is darker, a smaller frequency is selected, and for a target portion of an image that is lighter, a larger frequency is selected;
   b. specifying first and second candidate-sets of positions within the half-toned digital image IMG, the first candidate-set of positions being periodically disposed within the first neighboring column at the established frequency, the second candidate-set of positions being periodically disposed within the second neighboring column at the established frequency;
   c. determining the data-occupied positions within the $i^{th}$ column of the half-toned digital image IMG, the $i^{th}$ column of the half-toned digital image IMG corresponding to the malfunctioning or inoperative nozzle;
   d. for each data-occupied position within the $i^{th}$ column of the half-toned digital image IMG, respectively determining if at least one column-neighboring position within the neighboring columns is data-vacant; and
   e. printing, on the target surface, a modified version of the digital image IMG so as to enforce of first, second and third data-moving rules and so as to enforce a droplet-size-increase rule, wherein the rules are defined as follows:
      i. according to the first data-moving rule, whenever a given position (i,j) within the $i^{th}$ column of the half-toned digital image IMG is data-occupied, at most one data-moving droplet is deposited on the target surface;
      ii. according to the second data-moving rule, this data-moving droplet is only deposited if one or both of the column-neighboring positions (i.e. one or both of the positions (i−1,j) and (i+1,j)) is data-vacant;
      iii. according to the third data-moving rule, if deposited, the data-moving droplet is only deposited at a location corresponding to one of the column-neighboring positions that is data-vacant in the source half-toned image; and
      iv. according to the droplet size-increase rule, a deposited droplet is subjected to nozzle-compensation droplet-size increase if and only if the deposited droplet corresponds to a position belonging to one of the first and second candidate-sets of positions.

2. The method of claim 1, wherein the half-toned image IMG is an FM half-toned image.

3. A method of compensating for or reducing the effect of a malfunctioning or inoperative nozzle $Noz_i$ corresponding to the $i^{th}$ column of a half-toned digital image IMG that specifies, for each position (i,j) of the digital image whether or not a droplet is to be deposited at a corresponding location on a target surface, the $i^{th}$ column having first (i.e. $(i-1)^{th}$ column) and second (i.e. $(i+1)^{th}$ column) neighboring columns disposed on opposite sides of the $i^{th}$ column, the method comprising:
   a. establishing a frequency for droplet-size increase such that for a target portion of an image that is darker, a smaller frequency is selected, and for a target portion of an image that is lighter, a larger frequency is selected;
   b. specifying first and second candidate-sets of positions within the half-toned digital image IMG, the first candidate-set of positions being periodically disposed within the first neighboring column at the established frequency, the second candidate-set of positions being periodically disposed within the second neighboring column at the established frequency; and
   c. printing, on the target surface, a modified version of the digital image IMG so as to enforce a droplet-size-increase rule such that a deposited droplet is subjected to nozzle-compensation droplet-size increase if and only if the deposited droplet corresponds to a position belonging to one of the first and second candidate-sets of positions.

4. The method of claim 3, wherein the half-toned image IMG is an FM half-toned image.

5. A printing system for printing a half-toned digital image IMG that specifies, for each position (i,j) of the digital image whether or not a droplet is to be deposited at a corresponding location on a target surface, the printing system comprising:
   a. a plurality of nozzles for depositing droplets of ink onto the target surface so as to print, each nozzle $Noz_i$ of the plurality corresponding to the $i^{th}$ column of the half-toned digital image IMG, the $i^{th}$ column of the image IMG having first (i.e. $(i-1)^{th}$ column) and second (i.e. $(i+1)^{th}$ column) neighboring columns disposed on opposite sides of the $i^{th}$ column,
   b. electronic circuitry for controlling deposition of the droplets by the nozzle array according to content of the half-toned digital image IMG to print the half-toned digital image IMG, or a derivative thereof, on the target surface, the control circuitry configured, when the nozzle $Noz_i$ is malfunctioning or inoperative, to perform nozzle compensation as follows:

i. establishing a frequency for droplet-size increase such that for a target portion of an image that is darker, a smaller frequency is selected, and for a target portion of an image that is lighter, a larger frequency is selected;

ii. specifying first and second candidate-sets of positions within the half-toned digital image IMG, the first candidate-set of positions being periodically disposed within the first neighboring column at the established frequency, the second candidate-set of positions being periodically disposed within the second neighboring column at the established frequency;

iii. determining the data-occupied positions within the $i^{th}$ column of the half-toned digital image IMG, the $i^{th}$ column of the half-toned digital image IMG corresponding to the malfunctioning or inoperative nozzle;

iv. for each data-occupied position within the $i^{th}$ column of the half-toned digital image IMG, respectively determining if at least one column-neighboring position within the neighboring columns is data-vacant; and v. printing, on the target surface, a modified version of the digital image IMG so as to enforce of first, second and third data-moving rules and so as to enforce a droplet-size-increase rule, wherein the rules are defined as follows:

A. according to the first data-moving rule, whenever a given position (i,j) within the $i^{th}$ column of the half-toned digital image IMG is data-occupied, at most one data-moving droplet is deposited on the target surface;

B. according to the second data-moving rule, this data-moving droplet is only deposited if one or both of the column-neighboring positions (i.e. one or both of the positions (i−1,j) and (i+1,j)) is data-vacant;

C. according to the third data-moving rule, if deposited, the data-moving droplet is only deposited at a location corresponding to one of the column-neighboring positions that is data-vacant in the source half-toned image; and D. according to the droplet size-increase rule, a deposited droplet is subjected to nozzle-compensation droplet-size increase if and only if the deposited droplet corresponds to a position belonging to one of the first and second candidate-sets of positions.

6. A printing system for printing a half-toned digital image IMG that specifies, for each position (i,j) of the digital image whether or not a droplet is to be deposited at a corresponding location on a target surface, the printing system comprising:

a. a plurality of nozzles for depositing droplets of ink onto the target surface so as to print, each nozzle $Noz_i$ of the plurality corresponding to the $i^{th}$ column of the half-toned digital image IMG, the $i^{th}$ column of the image IMG having first (i.e. $(i-1)^{th}$ column) and second (i.e. $(i+1)^{th}$ column) neighboring columns disposed on opposite sides of the $i^{th}$ column, b. electronic circuitry for controlling deposition of the droplets by the nozzle array according to content of the half-toned digital image IMG to print the half-toned digital image IMG, or a derivative thereof, on the target surface, the control circuitry configured, when the nozzle Noz is malfunctioning or inoperative, to perform nozzle compensation as follows:

i. establishing a frequency for droplet-size increase such that for a target portion of an image that is darker, a smaller frequency is selected, and for a target portion of an image that is lighter, a larger frequency is selected;

ii. specifying first and second candidate-sets of positions within the half-toned digital image IMG, the first candidate-set of positions being periodically disposed within the first neighboring column at the established frequency, the second candidate-set of positions being periodically disposed within the second neighboring column at the established frequency; and iii. printing, on the target surface, a modified version of the digital image IMG so as to enforce a droplet-size-increase rule such that a deposited droplet is subjected to nozzle-compensation droplet-size increase if and only if the deposited droplet corresponds to a position belonging to one of the first and second candidate-sets of positions.

* * * * *